(12) United States Patent
Kawasaki et al.

(10) Patent No.: US 8,983,149 B2
(45) Date of Patent: Mar. 17, 2015

(54) INFORMATION PROCESSING APPARATUS, IMAGE SELECTION METHOD, ALBUM CREATION SYSTEM, AND STORAGE MEDIUM

(71) Applicant: Canon Kabushiki Kaisha, Tokyo (JP)

(72) Inventors: Katsuhiko Kawasaki, Kawasaki (JP); Shigeki Mori, Koshigaya (JP)

(73) Assignee: Canon Kabushiki Kaisha, Toyko (JP)

( * ) Notice: Subject to any disclaimer, the term of this patent is extended or adjusted under 35 U.S.C. 154(b) by 168 days.

(21) Appl. No.: 13/649,883

(22) Filed: Oct. 11, 2012

(65) Prior Publication Data

US 2013/0094721 A1 Apr. 18, 2013

(30) Foreign Application Priority Data

Oct. 14, 2011 (JP) ................................. 2011-227049

(51) Int. Cl.
| | | |
|---|---|---|
| *G06K 9/00* | (2006.01) | |
| *G06K 9/20* | (2006.01) | |
| *G06F 17/30* | (2006.01) | |

(52) U.S. Cl.
CPC ............................. *G06F 17/30265* (2013.01)
USPC ........................................ 382/118; 382/282

(58) Field of Classification Search
None
See application file for complete search history.

(56) References Cited

U.S. PATENT DOCUMENTS

| | | | | |
|---|---|---|---|---|
| 6,035,323 A | * | 3/2000 | Narayen et al. | 709/201 |
| 7,054,508 B2 | | 5/2006 | Hanamoto | |
| 7,340,676 B2 | * | 3/2008 | Geigel et al. | 715/716 |
| 7,518,640 B2 | | 4/2009 | Nakajima et al. | |
| 7,711,145 B2 | * | 5/2010 | Gallagher | 382/103 |
| 7,724,978 B2 | | 5/2010 | Nonaka et al. | |
| 7,843,581 B2 | * | 11/2010 | Hill et al. | 358/1.15 |
| 7,929,809 B2 | * | 4/2011 | Snowdon et al. | 382/305 |
| 8,040,551 B2 | * | 10/2011 | Ono et al. | 358/1.18 |
| 8,631,322 B2 | * | 1/2014 | Isomura et al. | 715/253 |
| 2010/0164836 A1 | * | 7/2010 | Liberatore | 345/1.1 |

FOREIGN PATENT DOCUMENTS

| | | |
|---|---|---|
| JP | 2002-010068 A | 1/2002 |
| JP | 2002-049907 A | 2/2002 |
| JP | 2006-277065 A | 10/2006 |
| JP | 2010-57073 A | 3/2010 |
| JP | 2010-136092 A | 6/2010 |

\* cited by examiner

*Primary Examiner* — Daniel Mariam
(74) *Attorney, Agent, or Firm* — Canon USA Inc. IP Division

(57) ABSTRACT

An information processing apparatus for selecting images used in an album indicating a group of a plurality of images includes a person setting unit configured to set a person appearing in an image included in the album, an image evaluation unit configured to evaluate an image based on a composition of the image, a count unit configured to count a number of times in which the person set by the person setting unit appears in a plurality of images, and a selection unit configured to select images used in the album based on evaluation made by the image evaluation unit, and a count value obtained by the count unit.

12 Claims, 31 Drawing Sheets

FIG.4A
FIG.4B
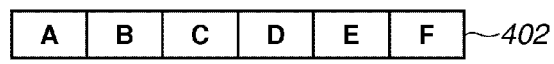
FIG.4C
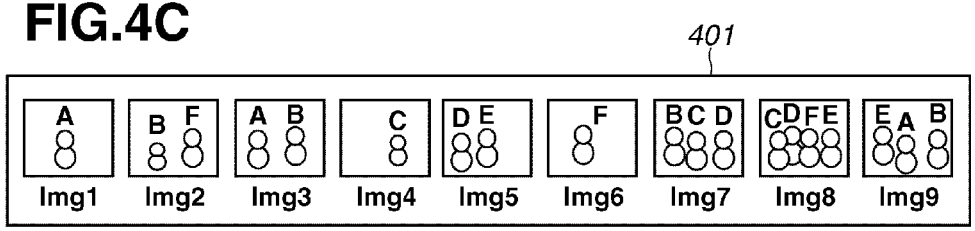
FIG.4D1
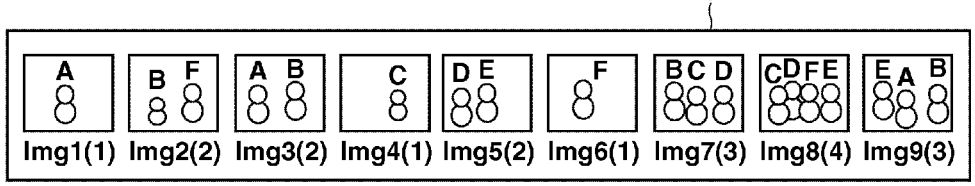
FIG.4D2
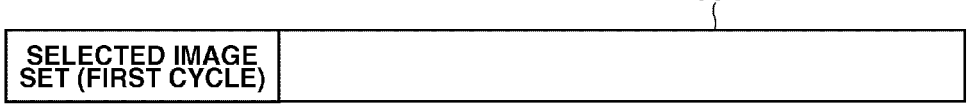

FIG.5F4
CYCLIC IMAGE SET
(FOURTH CYCLE)                    2503-4
Img8(4)    Img10(4) Img11(4) Img12(3)
FIG.5G4
|   | Img1 | Img2 | Img3 | Img4 | Img5 | Img6 | Img7 | Img8 | Img9 | Img10 | Img11 | Img12 |   |
|---|------|------|------|------|------|------|------|------|------|-------|-------|-------|---|
| A | 5    |      |      |      |      |      |      | (1)  |      |       |       |       | 6 |
| B |      | (2)  |      | 3    |      |      |      | (1)  |      |       |       |       | 6 |
| C |      | 2    | (1)  |      | (1)  |      | (2)  | (1)  |      |       |       |       | 7 |
| D |      |      |      |      | 2    |      | 2    | 2    |      |       |       |       | 6 |
| E |      |      | 2    |      | (1)  |      |      | (1)  | 2    |       |       |       | 6 |
| F |      |      | (1)  |      |      | 5    |      |      |      |       |       |       | 6 |
2504-4
FIG.5H4
SELECTED IMAGE                    2505-4
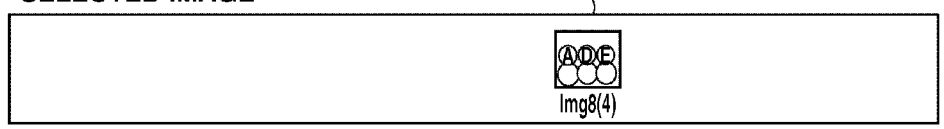
Img8(4)

FIG.6A1
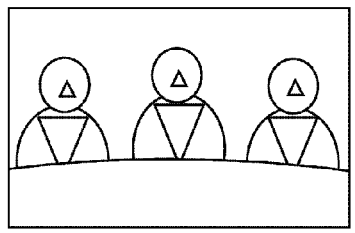
FIG.6A2
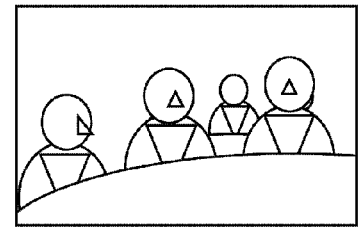
FIG.6B1
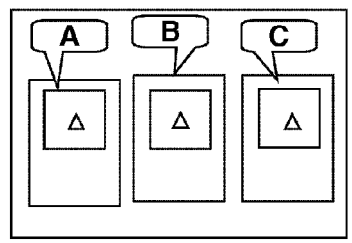
FIG.6B2
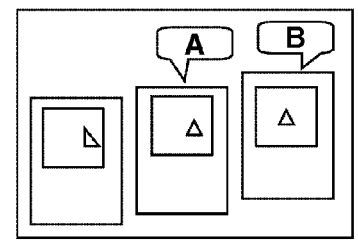

FIG.7E1
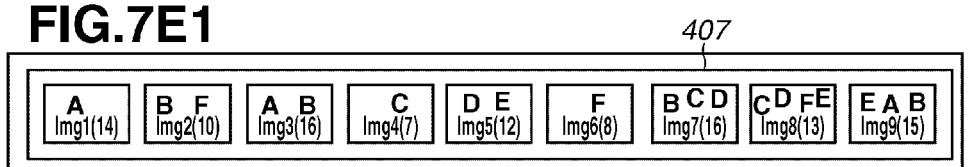
FIG.7E2
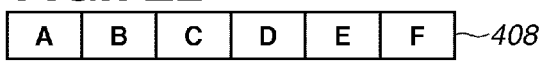
FIG.7F1
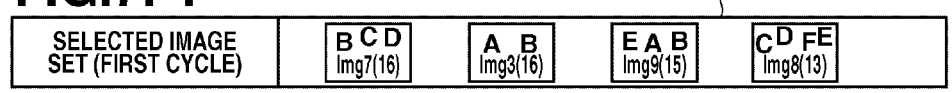
FIG.7F2
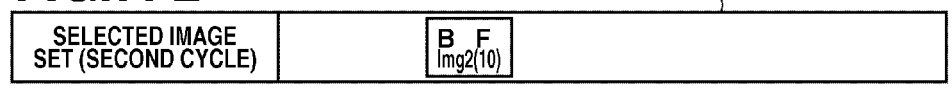
FIG.7F3
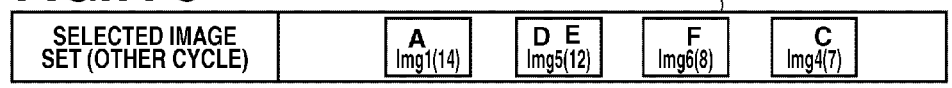
FIG.7G
| | A | B | C | D | E | F |
|---|---|---|---|---|---|---|
| THE NUMBER OF APPEARANCES OF EACH OBJECT (FIRST CYCLE) | 2 | 3 | 2 | 2 | 2 | 1 |
| THE NUMBER OF APPEARANCES OF EACH OBJECT (SECOND CYCLE) | 2 | 4 | 2 | 2 | 2 | 2 |
| OTHERS | 3 | 4 | 3 | 3 | 3 | 3 |
FIG.7H1
FIG.7H2
FIG.7H3

FIG.9A1
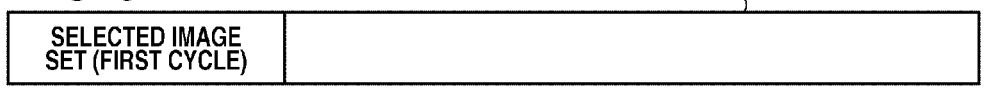
FIG.9A2
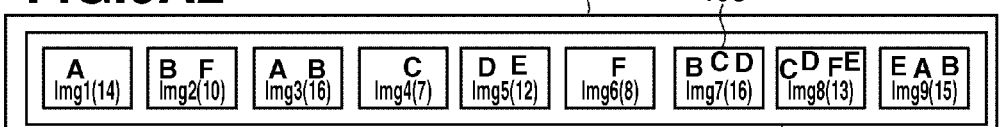
FIG.9B1
FIG.9B2
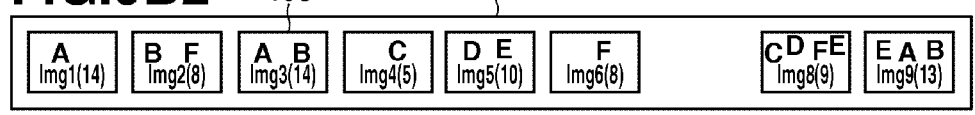
FIG.9C1
FIG.9C2
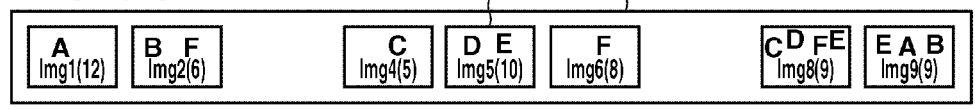
FIG.9D1
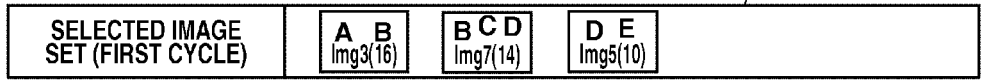
FIG.9D2

FIG.9E1

| SELECTED IMAGE LIST (FIRST CYCLE) | A B Img3(16) | B C D Img7(14) | D E Img5(10) | F Img6(8) | |
|---|---|---|---|---|---|

| A Img1(12) | B F Img2(4) | | C Img4(5) | | C D F E Img8(3) | E A B Img9(7) |
|---|---|---|---|---|---|---|

FIG.9E3

| | A | B | C | D | E | F |
|---|---|---|---|---|---|---|
| THE NUMBER OF APPEARANCES OF EACH OBJECT | 1 | 2 | 1 | 2 | 1 | 1 |

404

FIG.10F1
FIG.10F2
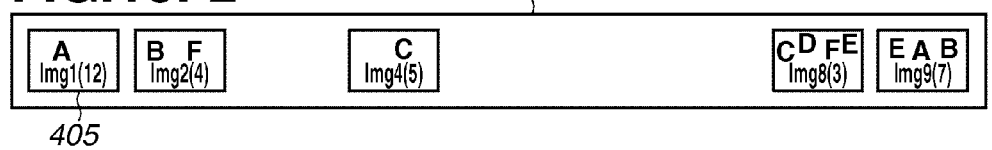
FIG.10G1
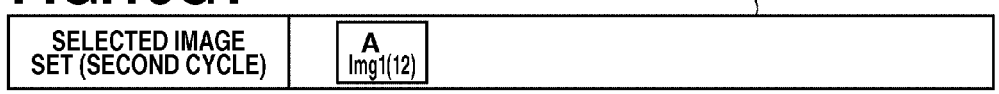
FIG.10G2
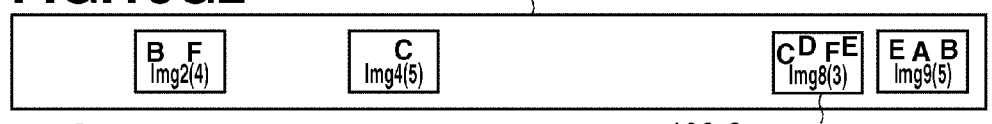
FIG.10H1
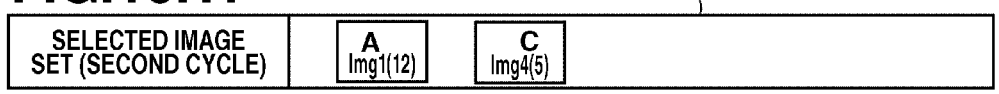
FIG.10H2
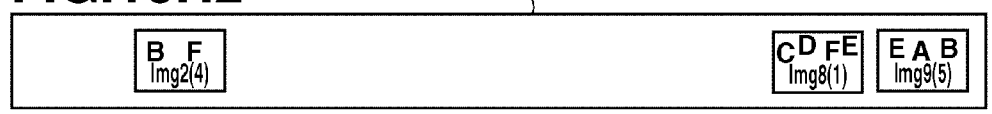

FIG.10I1

| SELECTED IMAGE SET (SECOND CYCLE) | A<br>Img1(12) | C<br>Img4(5) | E A B<br>Img9(5) | 403-2 |

FIG.10I2 407

| B F<br>Img2(2) | | C D F E<br>Img8(-1) |

FIG.10J1 403-3

| SELECTED IMAGE SET (SECOND CYCLE) | A<br>Img1(12) | C<br>Img4(5) | E A B<br>Img9(5) | B F<br>Img2(2) |

FIG.10J2 407

| | | C D F E<br>Img8(-3) |

FIG.10J3

| | A | B | C | D | E | F |
|---|---|---|---|---|---|---|
| THE NUMBER OF APPEARANCES OF EACH OBJECT | 3 | 4 | 2 | 2 | 2 | 2 |

404

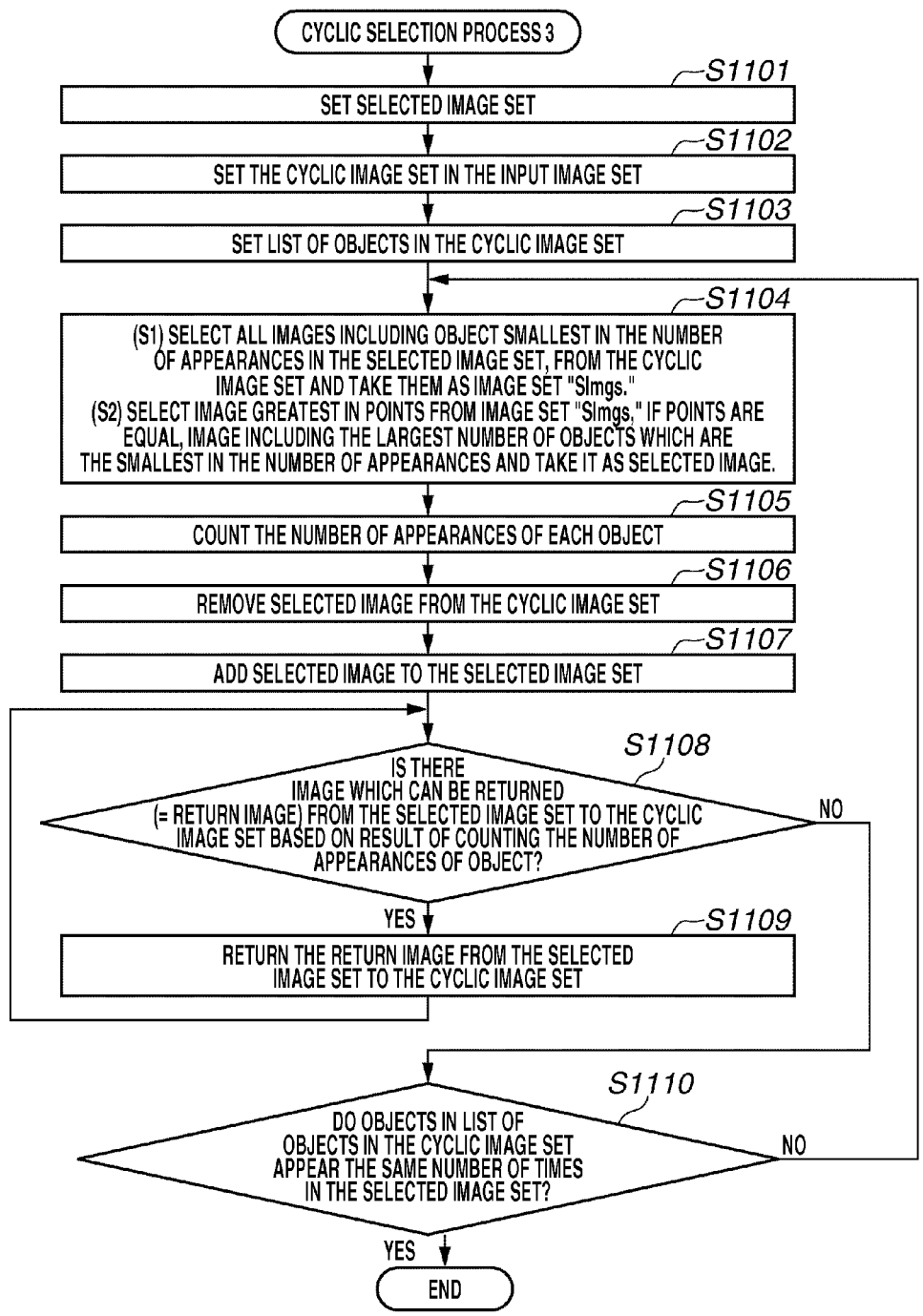

FIG.12A1

| SELECTED IMAGE SET (FIRST CYCLE) | |
|---|---|

| A Img1(14) | B F Img2(10) | A B Img3(16) | C Img4(7) | D E Img5(12) | F Img6(8) | B C D Img7(16) | C D F E Img8(13) | E A B Img9(15) |
|---|---|---|---|---|---|---|---|---|

|  | A | B | C | D | E | F |
|---|---|---|---|---|---|---|
| THE NUMBER OF APPEARANCES OF EACH OBJECT | 0 | 0 | 0 | 0 | 0 | 0 |

| SELECTED IMAGE SET (FIRST CYCLE) | B C D Img7(16) |
|---|---|

| A Img1(14) | B F Img2(10) | A B Img3(16) | C Img4(7) | D E Img5(12) | F Img6(8) | C D F E Img8(13) | E A B Img9(15) |
|---|---|---|---|---|---|---|---|

FIG.12B3

|  | A | B | C | D | E | F |
|---|---|---|---|---|---|---|
| THE NUMBER OF APPEARANCES OF EACH OBJECT | 0 | 1 | 1 | 1 | 0 | 0 |

| SELECTED IMAGE SET (FIRST CYCLE) | B C D<br>Img7(16) | A B<br>Img3(16) | | | | | 403-1 |

FIG.12C2  407  405

| A<br>Img1(14) | B F<br>Img2(10) | C<br>Img4(7) | D E<br>Img5(12) | F<br>Img6(8) | C D F E<br>Img8(13) | E A B<br>Img9(15) |

FIG.12C3

| | A | B | C | D | E | F |
|---|---|---|---|---|---|---|
| THE NUMBER OF APPEARANCES OF EACH OBJECT | 1 | 2 | 1 | 1 | 0 | 0 |

FIG.12D1  404  403-1

| SELECTED IMAGE SET (FIRST CYCLE) | B C D<br>Img7(16) | A B<br>Img3(16) | E A B<br>Img9(15) |

FIG.12D2  406  407

| A<br>Img1(14) | B F<br>Img2(10) | C<br>Img4(7) | D E<br>Img5(12) | F<br>Img6(8) | C D F E<br>Img8(13) |

FIG.12D3

| | A | B | C | D | E | F |
|---|---|---|---|---|---|---|
| THE NUMBER OF APPEARANCES OF EACH OBJECT | 2 | 3 | 1 | 1 | 1 | 0 |

| SELECTED IMAGE SET (FIRST CYCLE) | B C D<br>Img7(16) | E A B<br>Img9(15) |

| A<br>Img1(14) | B F<br>Img2(10) | A B<br>Img3(16) | C<br>Img4(7) | D E<br>Img5(12) | F<br>Img6(8) | C D F E<br>Img8(13) |

FIG.13E3

| | A | B | C | D | E | F |
|---|---|---|---|---|---|---|
| THE NUMBER OF APPEARANCES OF EACH OBJECT | 1 | 2 | 1 | 1 | 1 | 0 |

| SELECTED IMAGE SET (FIRST CYCLE) | B C D<br>Img7(16) | E A B<br>Img9(15) | C D F E<br>Img8(13) |

| A<br>Img1(14) | B F<br>Img2(10) | A B<br>Img3(16) | C<br>Img4(7) | D E<br>Img5(12) | F<br>Img6(8) |

FIG.13F3

| | A | B | C | D | E | F |
|---|---|---|---|---|---|---|
| THE NUMBER OF APPEARANCES OF EACH OBJECT | 1 | 2 | 2 | 2 | 2 | 1 |

| SELECTED IMAGE SET (FIRST CYCLE) | | E A B<br>Img9(15) | C D F E<br>Img8(13) 403-1 |

FIG.13G2

| A<br>Img1(14) | B F<br>Img2(10) | A B<br>Img3(16) | C<br>Img4(7) | D E<br>Img5(12) | F<br>Img6(8) | B C D<br>Img7(16) |

|  | A | B | C | D | E | F |
|---|---|---|---|---|---|---|
| THE NUMBER OF APPEARANCES OF EACH OBJECT | 1 | 1 | 1 | 1 | 2 | 1 |

| SELECTED IMAGE SET (SECOND CYCLE) | | 403-2 |

FIG.13H2

| SELECTED IMAGE SET (SECOND CYCLE) | B C D<br>Img7(16) | 403-2 |

| A<br>Img1(14) | B F<br>Img2(10) | A B<br>Img3(16) | C<br>Img4(7) | D E<br>Img5(12) | F<br>Img6(8) |

FIG.13H4

|  | A | B | C | D | E | F |
|---|---|---|---|---|---|---|
| THE NUMBER OF APPEARANCES OF EACH OBJECT | 1 | 2 | 2 | 2 | 2 | 1 |

| SELECTED IMAGE SET (SECOND CYCLE) | B C D<br>Img7(16) | A  B<br>Img3(16) | | |
|---|---|---|---|---|

| A<br>Img1(14) | B  F<br>Img2(10) | | C<br>Img4(7) | D E<br>Img5(12) | F<br>Img6(8) |
|---|---|---|---|---|---|

| | A | B | C | D | E | F |
|---|---|---|---|---|---|---|
| THE NUMBER OF APPEARANCES OF EACH OBJECT | 2 | 3 | 2 | 2 | 2 | 1 |

| SELECTED IMAGE SET (SECOND CYCLE) | B C D<br>Img7(16) | A  B<br>Img3(16) | B  F<br>Img2(10) |
|---|---|---|---|

| A<br>Img1(14) | C<br>Img4(7) | D E<br>Img5(12) | F<br>Img6(8) |
|---|---|---|---|

FIG.14J3

| | A | B | C | D | E | F |
|---|---|---|---|---|---|---|
| THE NUMBER OF APPEARANCES OF EACH OBJECT | 2 | 4 | 2 | 2 | 2 | 2 |

| SELECTED IMAGE SET (OTHER CYCLE) | A<br>Img1(14) | D E<br>Img5(12) | F<br>Img6(8) | C<br>Img4(7) |
|---|---|---|---|---|

FIG.14K1 403-C2

| SELECTED IMAGE SET (C, 2 IMAGES) | E A B Img9(15) | C D F E Img8(13) |

FIG.14K2 403-C5

| SELECTED IMAGE SET (C, 5 IMAGES) | E A B Img9(15) | C D F E Img8(13) | B C D Img7(16) | A B Img3(16) | B F Img2(10) |

FIG.14K3 403-C6

| SELECTED IMAGE SET (C, 6 IMAGES) | E A B Img9(15) | C D F E Img8(13) | A B Img3(16) | B C D Img7(16) | B F Img2(10) | C Img4(7) |

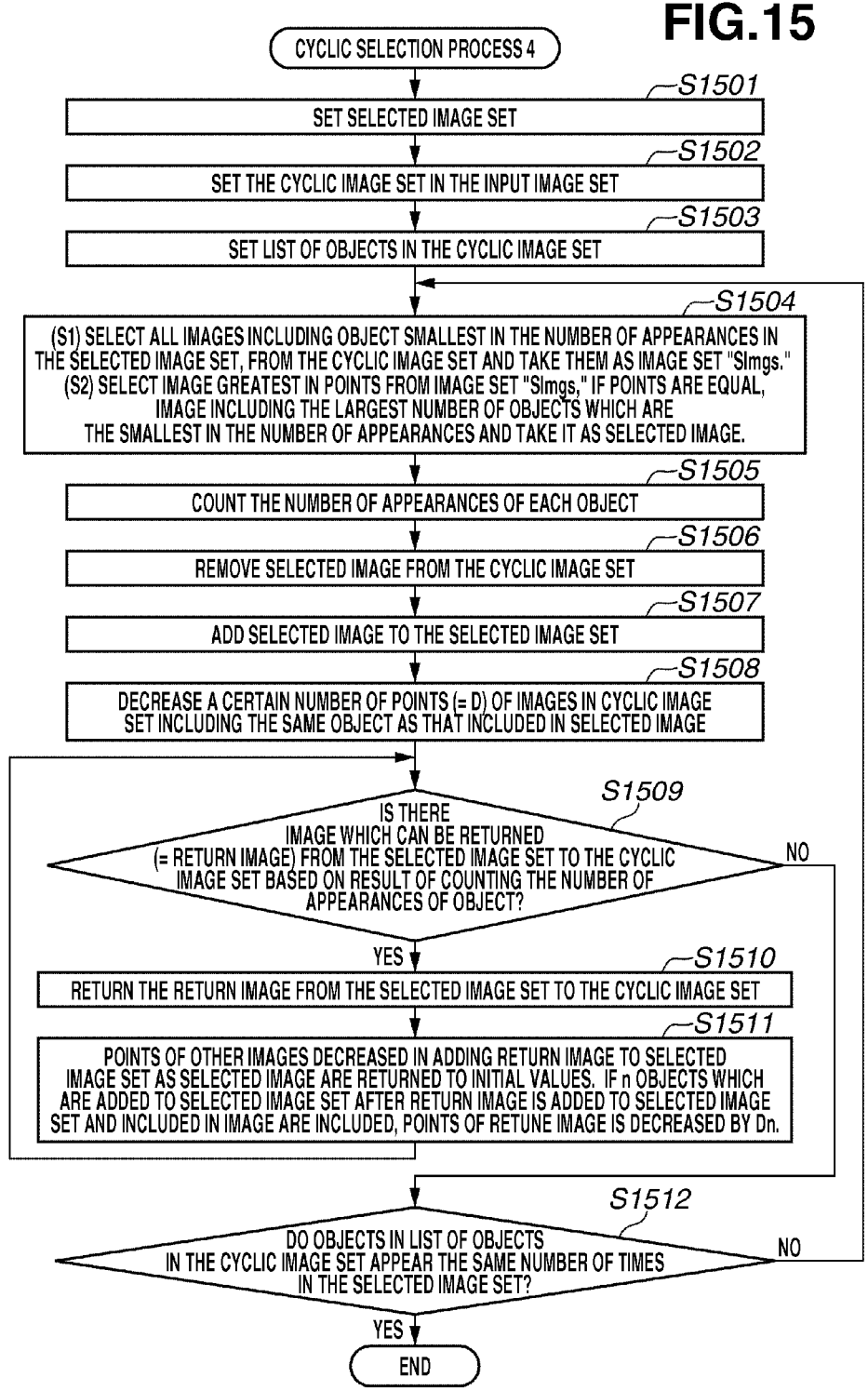

IF C IS A SUBJECT, C(+10)

| A<br>Img1(14) | B F<br>Img2(10) | A B<br>Img3(16) | C<br>Img4(17) | D E<br>Img5(12) | F<br>Img6(8) | B C D<br>Img7(26) | C D F E<br>Img8(23) | E A B<br>Img9(15) |

| SELECTED IMAGE SET<br>(C, THE FIRST CYCLE) | B C D<br>Img7(26) |

| SELECTED IMAGE SET<br>(C, THE SECOND CYCLE) | C D F E<br>Img8(23) |

| SELECTED IMAGE SET<br>(C, THE THIRD CYCLE) | C<br>Img4(17) |

FIG.16B4

| | A | B | C | D | E | F |
|---|---|---|---|---|---|---|
| THE NUMBER OF APPEARANCES OF EACH OBJECT | 0 | 1 | 3 | 2 | 1 | 1 |

| SELECTED IMAGE<br>SET (FIRST CYCLE) | A B<br>Img3(16) |

FIG.16C2

| | A | B | C | D | E | F |
|---|---|---|---|---|---|---|
| THE NUMBER OF APPEARANCES OF EACH OBJECT | 1 | 2 | 3 | 2 | 1 | 1 |

| SELECTED IMAGE<br>SET (SECOND CYCLE) | E A B<br>Img9(15) | B F<br>Img2(10) |

FIG.16D2

| | A | B | C | D | E | F |
|---|---|---|---|---|---|---|
| THE NUMBER OF APPEARANCES OF EACH OBJECT | 2 | 4 | 3 | 2 | 2 | 2 |

404

IF A AND B ARE SUBJECTS, A(+10), B(+10)

FIG.17A
*407*

| A<br>Img1(24) | B F<br>Img2(20) | A B<br>Img3(36) | C<br>Img4(7) | D E<br>Img5(12) | F<br>Img6(8) | B C D<br>Img7(26) | C D F E<br>Img8(13) | E A B<br>Img9(35) |

FIG.17B1   *403-AB1*   *401*

| SELECTED IMAGE SET<br>(AB, THE FIRST CYCLE) | A B<br>Img3(36) |

FIG.17B2   *403-AB2*

| SELECTED IMAGE SET<br>(AB, THE SECOND CYCLE) | E A B<br>Img9(35) |

FIG.17B3   *403-AB3*

| SELECTED IMAGE SET<br>(AB, THE THIRD CYCLE) | B C D<br>Img7(26) | A<br>Img1(24) |

FIG.17B4

| | A | B | C | D | E | F |
|---|---|---|---|---|---|---|
| THE NUMBER OF APPEARANCES OF EACH OBJECT | 3 | 3 | 1 | 1 | 1 | 0 |

FIG.17C1   *404*   *403-1*

| SELECTED IMAGE<br>SET (FIRST CYCLE) | B F<br>Img2(20) |

FIG.17C2

| | A | B | C | D | E | F |
|---|---|---|---|---|---|---|
| THE NUMBER OF APPEARANCES OF EACH OBJECT | 3 | 4 | 1 | 1 | 1 | 1 |

FIG.17D1   *404*   *403-2*

| SELECTED IMAGE<br>SET (SECOND CYCLE) | C D F E<br>Img8(13) |

FIG.17D2

| | A | B | C | D | E | F |
|---|---|---|---|---|---|---|
| THE NUMBER OF APPEARANCES OF EACH OBJECT | 3 | 4 | 2 | 2 | 2 | 2 |

*404*

PRIORITY SETTING A(+5), B(+5), C(+10), D(+20), E(+0), F(+15)
FIG.18A
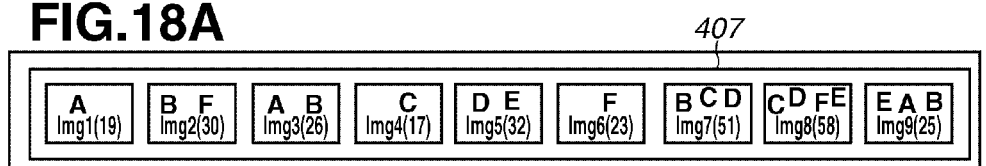
FIG.18B1
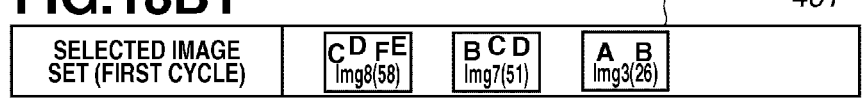
FIG.18C1
| | A | B | C | D | E | F |
|---|---|---|---|---|---|---|
| THE NUMBER OF APPEARANCES OF EACH OBJECT | 1 | 2 | 2 | 2 | 1 | 1 |
FIG.18B2
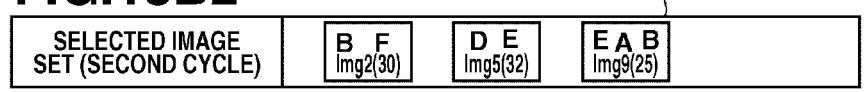
FIG.18C2
| | A | B | C | D | E | F |
|---|---|---|---|---|---|---|
| THE NUMBER OF APPEARANCES OF EACH OBJECT | 2 | 4 | 2 | 3 | 3 | 2 |
FIG.18B3
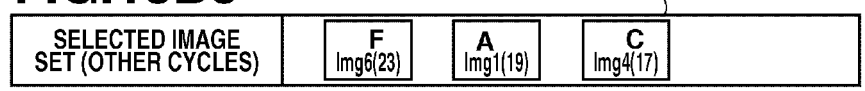
FIG.18C3
| | A | B | C | D | E | F |
|---|---|---|---|---|---|---|
| THE NUMBER OF APPEARANCES OF EACH OBJECT | 3 | 4 | 3 | 3 | 3 | 3 |

FIG.19A1
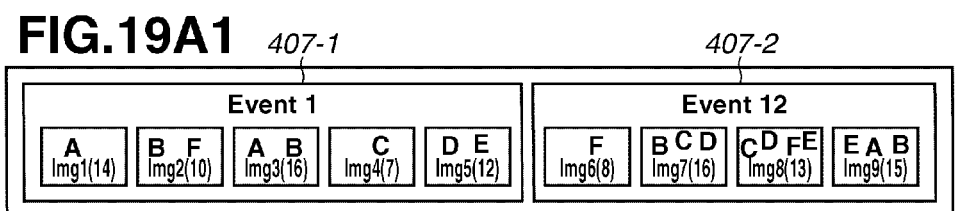
FIG.19A2
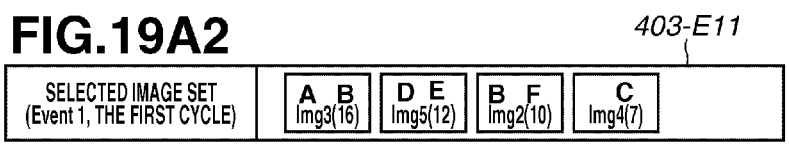
FIG.19A3
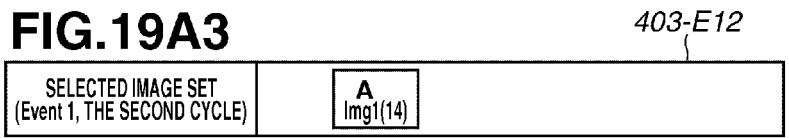
FIG.19A4
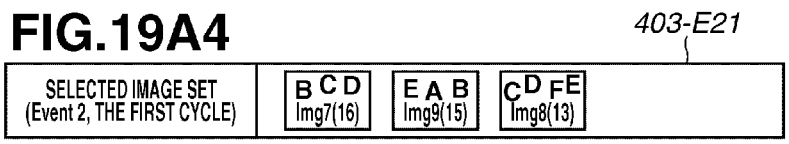
FIG.19A5
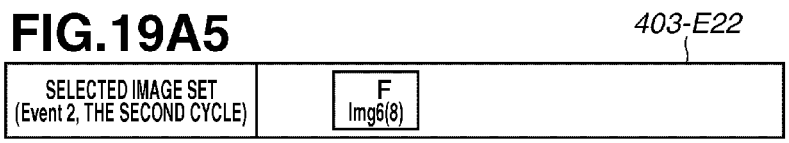

FIG.20B1
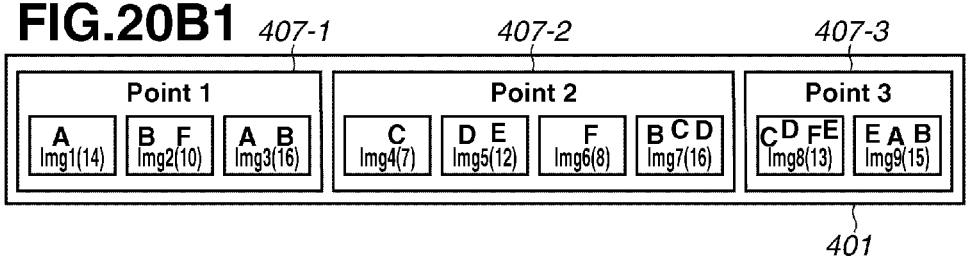
FIG.20B2
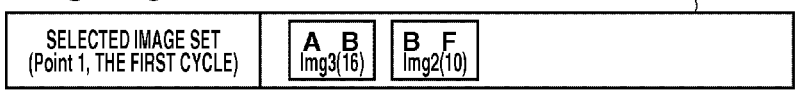
FIG.20B3
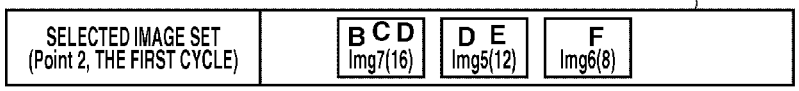
FIG.20B4
FIG.20B5
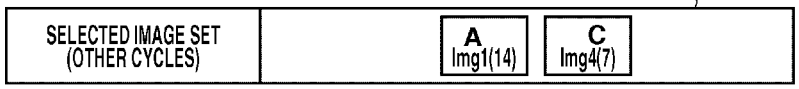

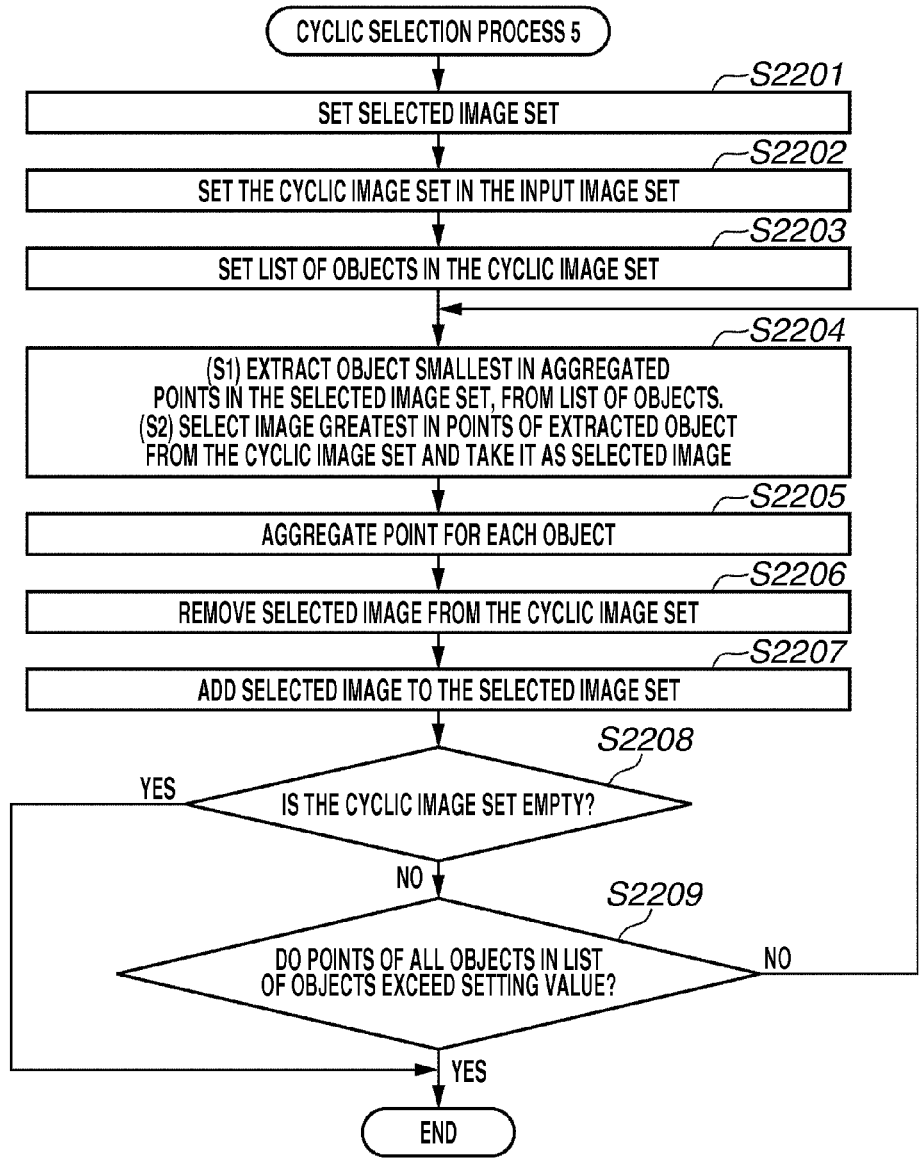

FIG.23A
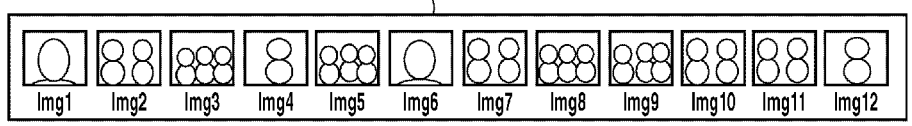
FIG.23B
| A | B | C | D | E | F | —2302
FIG.23C
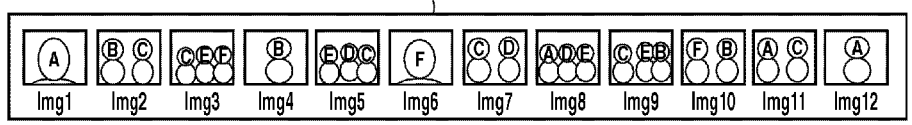
FIG.23D1
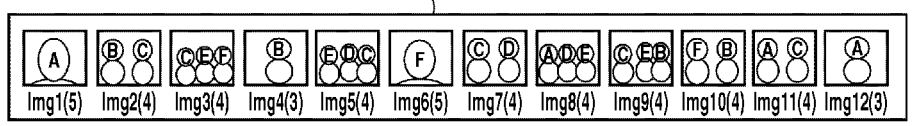
FIG.23D2  2303-1

FIG.24A1
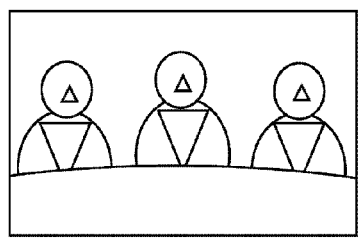
FIG.24A2
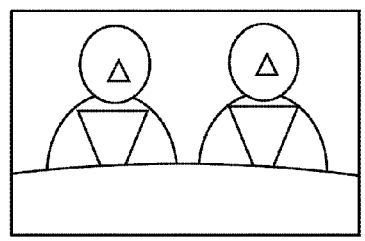
FIG.24B1
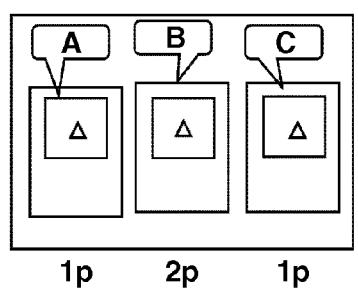
FIG.24B2
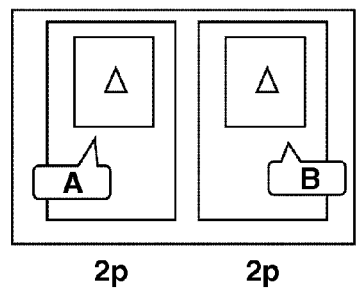
FIG.24A3
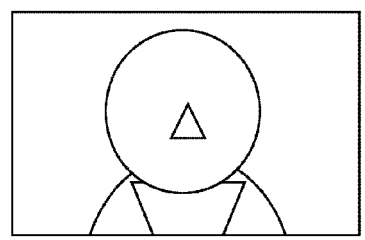
FIG.24A4
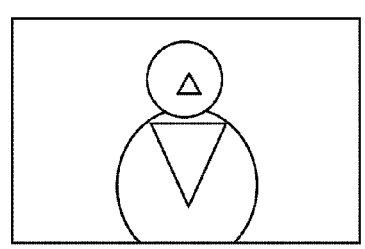
FIG.24B3
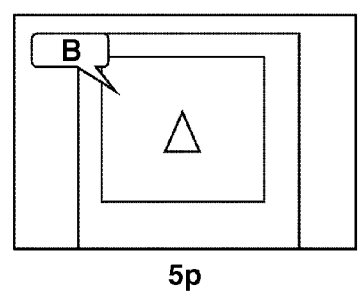
FIG.24B4
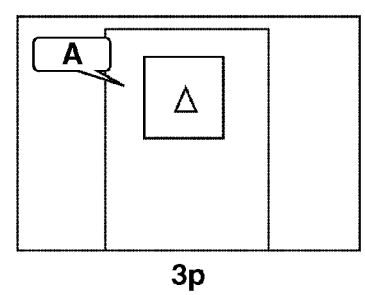

FIG.25E
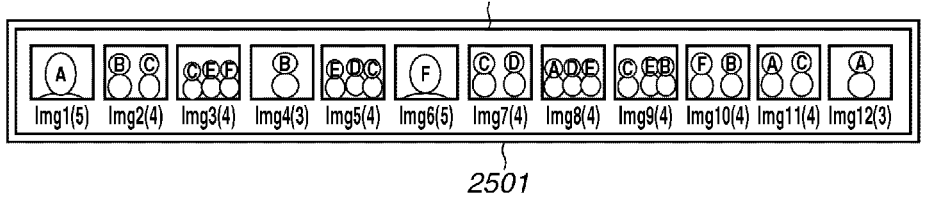
2507
FIG.25F1
CYCLIC IMAGE SET
(FIRST CYCLE)    2503-1
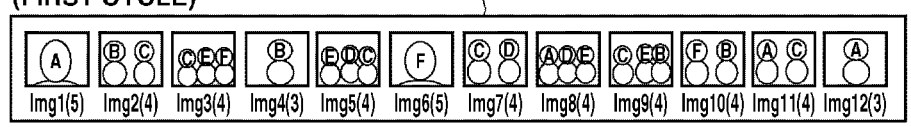
FIG.25G1
|   | Img1 | Img2 | Img3 | Img4 | Img5 | Img6 | Img7 | Img8 | Img9 | Img10 | Img11 | Img12 |   |
|---|------|------|------|------|------|------|------|------|------|-------|-------|-------|---|
| A | 5    |      |      |      |      |      |      |      |      |       |       |       | 5 |
| B |      | (2)  |      | 3    |      |      |      |      |      |       |       |       | 5 |
| C |      | 2    | (1)  |      | (1)  |      |      |      |      |       |       |       | 4 |
| D |      |      |      |      | 2    |      |      |      |      |       |       |       | 2 |
| E |      |      | 2    |      | (1)  |      |      |      |      |       |       |       | 3 |
| F |      |      | (1)  |      |      | 5    |      |      |      |       |       |       | 6 |
2504-1
FIG.25H1
SELECTED IMAGE SET    2505-1
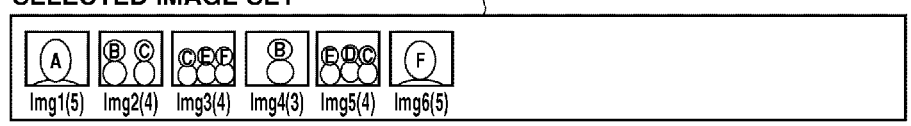

FIG.26F2
CYCLIC IMAGE SET (SECOND CYCLE)   2503-2
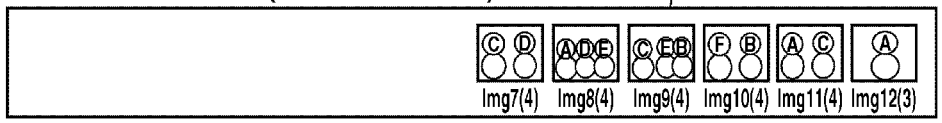
Img7(4) Img8(4) Img9(4) Img10(4) Img11(4) Img12(3)
FIG.26G2
|   | Img1 | Img2 | Img3 | Img4 | Img5 | Img6 | Img7 | Img8 | Img9 | Img10 | Img11 | Img12 |   |
|---|------|------|------|------|------|------|------|------|------|-------|-------|-------|---|
| A | 5    |      |      |      |      |      |      |      |      |       |       |       | 5 |
| B |      | (2)  |      | 3    |      |      |      |      |      |       |       |       | 5 |
| C |      | 2    | (1)  |      | (1)  |      | (2)  |      |      |       |       |       | 6 |
| D |      |      |      |      | 2    |      | 2    |      |      |       |       |       | 4 |
| E |      |      | 2    |      |      | (1)  |      |      |      |       |       |       | 3 |
| F |      |      | (1)  |      |      | 5    |      |      |      |       |       |       | 6 |
FIG.26H2
SELECTED IMAGE SET   2504-2   2505-2
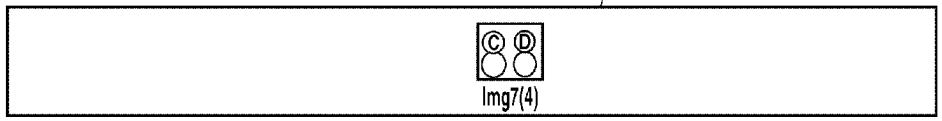
Img7(4)
FIG.26F3
CYCLIC IMAGE SET (THIRD CYCLE)   2503-3
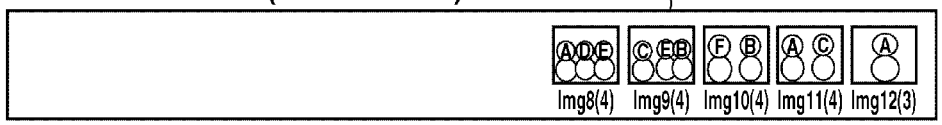
Img8(4) Img9(4) Img10(4) Img11(4) Img12(3)
FIG.26G3
|   | Img1 | Img2 | Img3 | Img4 | Img5 | Img6 | Img7 | Img8 | Img9 | Img10 | Img11 | Img12 |   |
|---|------|------|------|------|------|------|------|------|------|-------|-------|-------|---|
| A | 5    |      |      |      |      |      |      |      |      |       |       |       | 5 |
| B |      | (2)  |      | 3    |      |      |      |      | (1)  |       |       |       | 6 |
| C |      | 2    | (1)  |      | (1)  |      | (2)  |      | (1)  |       |       |       | 7 |
| D |      |      |      |      | 2    |      | 2    |      |      |       |       |       | 4 |
| E |      |      | 2    |      |      | (1)  |      |      | 2    |       |       |       | 5 |
| F |      |      | (1)  |      |      | 5    |      |      |      |       |       |       | 6 |
FIG.26H3
SELECTED IMAGE SET   2504-3   2505-3
Img9(4)

INFORMATION PROCESSING APPARATUS, IMAGE SELECTION METHOD, ALBUM CREATION SYSTEM, AND STORAGE MEDIUM

BACKGROUND

1. Field of the Disclosure

Some embodiments of the claimed invention generally relate to information processing and, more particularly, to an information processing apparatus, an image selection method, an album creation system, and a storage medium.

2. Description of the Related Art

Until now, a technique has been proposed which reduces a burden to a user in selecting an image used in an album from a plurality of images. For example, there is a method in which an image used in an album is selected using accompanying information (meta data) such as date and time of captured image data (refer to Japanese Patent Application Laid-Open No. 2002-010068). The method discussed in Japanese Patent Application Laid-Open No. 2002-010068 associates specific accompanying information with each of image insertion areas on a template where images are arranged. An image having the same accompanying information as that corresponding to the image insertion area is arranged in the insertion frame to create an album. A method discussed in Japanese Patent Application Laid-Open No. 2006-277065 combines the template with an image based on information such as an object and a shooting condition set to each of the template and the image, to create an album. A method discussed in Japanese Patent Application Laid-Open No. 2002-049907 arranges on the template an image matching a keyword which corresponds to the scenario of an album to be created and is attached to the template.

The conventional techniques select an image used in an album by simple agreement of accompanying information between a template where an image is arranged and an image. On the other hand, in a general album, it is necessary that a person appears as evenly as possible. However, an image which has such a composition problem that a person in an image is very small and out of center should not be used. The above patent documents do not take into consideration the selection of an image based on such a composition.

SUMMARY

The present disclosure is directed to the selection of images used in an album based on the number of times a person appears on the album, and composition related to the person in an image.

According to some embodiments of the claimed invention, an information processing apparatus for selecting images used in an album indicating a group of a plurality of images includes a person setting unit configured to set a person appearing in an image included in the album, an image evaluation unit configured to evaluate an image based on a composition of the image, a count unit configured to count a number of times in which the person set by the person setting unit appears in a plurality of images, and a selection unit configured to select images used in the album based on evaluation made by the image evaluation unit, and a count value obtained by the count unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

FIGS. 4A, 4B, 4C, 4D1, and 4D2 are schematic diagrams illustrating image selection in the cyclic selection process 1.

FIGS. 5F4, 5G4, and 5H4 are diagrams illustrating image selection in a cyclic selection process 5.

FIGS. 6A1, 6A2, 6B1, and 6B2 are schematic diagrams illustrating meta data for images.

FIGS. 7E1 to 7H3 are schematic diagrams illustrating image selection in the cyclic selection process 1.

FIGS. 9A1 to 9E3 are schematic diagrams illustrating image selection in the cyclic selection process 2.

FIGS. 10F1 to 10J3 are schematic diagrams illustrating image selection in the cyclic selection process 2.

FIG. 11 is a flow chart illustrating a cyclic selection process 3.

FIGS. 12A1 to 12D3 are schematic diagrams illustrating image selection in the cyclic selection process 3.

FIGS. 13E1 to 13H4 are schematic diagrams illustrating image selection in the cyclic selection process 3.

FIGS. 14I1 to 14K3 are schematic diagrams illustrating image selection in the cyclic selection process 3.

FIG. 15 is a flow chart illustrating a cyclic selection process 4.

FIGS. 16A to 16D2 are schematic diagrams illustrating image selection using object priority setting.

FIGS. 17A to 17D2 are schematic diagrams illustrating image selection using object priority setting.

FIGS. 18A to 18C3 are schematic diagrams illustrating the selection of images used in the album by putting priority on objects A to F.

FIGS. 19A1 to 19A5 are schematic diagrams illustrating the selection of images used in the album by classifying images based on shooting time frame.

FIGS. 20B1 to 20B5 are schematic diagrams illustrating the selection of images used in the album by classifying images by each shooting location.

FIG. 22 is a flow chart illustrating a cyclic selection process 5.

FIGS. 23A to 23D2 are schematic diagrams illustrating image selection in the cyclic selection process 5.

FIGS. 24A1 to 24B4 illustrate composition and point of an image.

FIGS. 25E to 25H1 are diagrams illustrating image selection in the cyclic selection process 5.

FIGS. 26F2 to 26H3 are diagrams illustrating image selection in the cyclic selection process 5.

DESCRIPTION OF THE EMBODIMENTS

Figure 1:
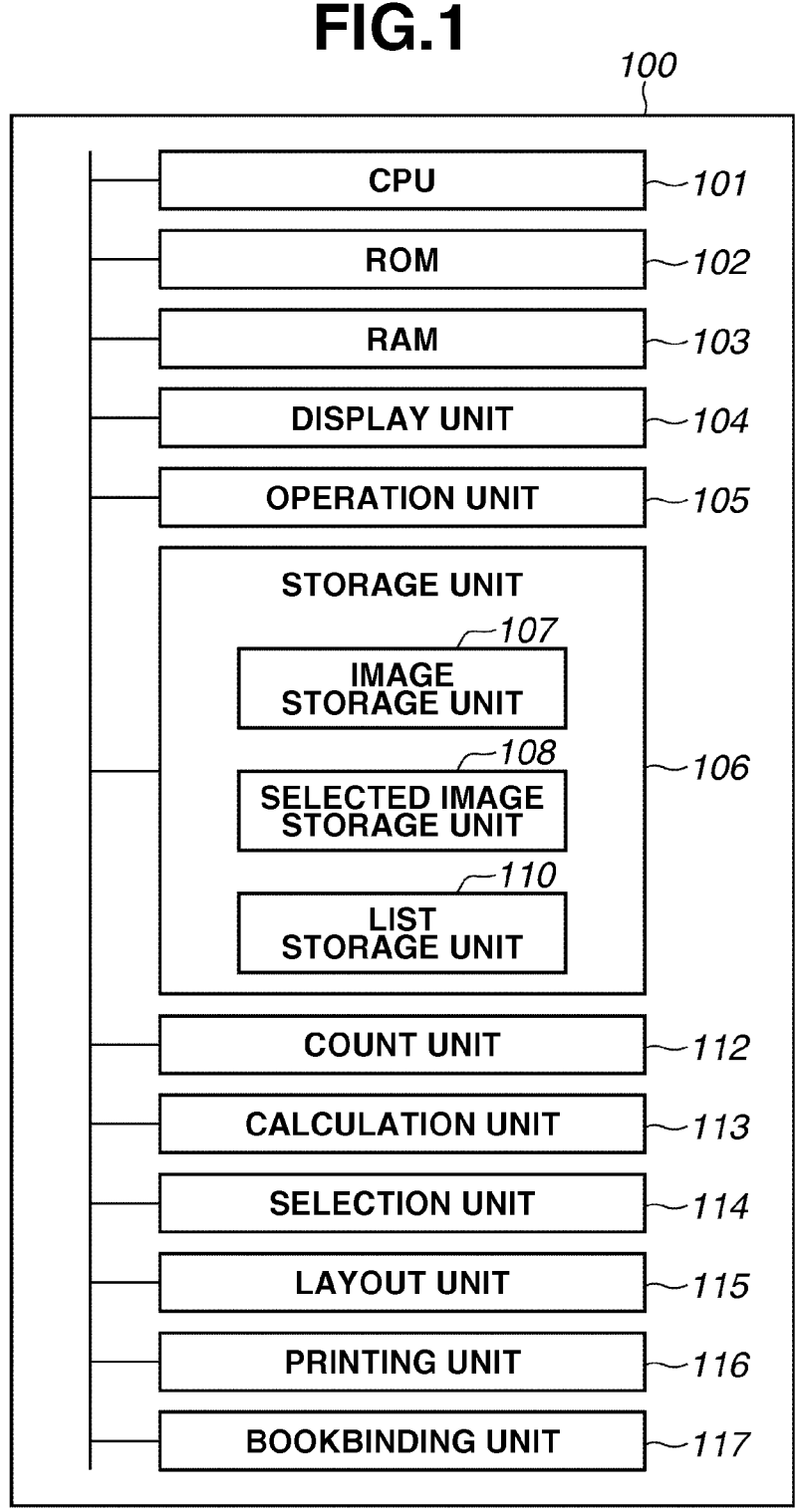
FIG. 1 is a block diagram of an album creation system.

Various exemplary embodiments, features, and aspects of the claimed invention will be described in detail below with reference to the drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

(Configuration of Album Creation System)

A first exemplary embodiment of the claimed invention is described below. FIG. 1 is a block diagram illustrating an example of a configuration of a computer executing an album creation process in the present exemplary embodiment. An information processing apparatus 100 functions as an album creation system. In the present exemplary embodiment, the term "album" refers to "a group of images". For example, a print product on which a plurality of images is arranged, print data in which a plurality of images is arranged, and electronic data for browsing a plurality of images are referred to as "album".

A computer 100 includes a central processing unit (CPU) 101, a read only memory (ROM) 102, a random access memory (RAM) 103, a display unit 104, and an operation unit 105. The computer 100 reads and executes the programs stored in the ROM 102 to perform control so that each process described below is executed. The computer 100 is further provided with a storage unit 106. The storage unit 106 includes an image storage unit 107, a selected image storage unit 108, and a list storage unit 110. The computer 100 is still further provided with a count unit 112, a calculation unit 113, a selection unit 114, a layout unit 115, a printing unit 116, and a bookbinding unit 117. The image storage unit 107 stores an input image which is a candidate for the image used in an album.

The selected image storage unit 108 stores the image selected from the input image (a selected image) and used in the album. The list storage unit 110 stores a list of objects set as an object which appears in the album (a person setting unit). The count unit 112 manages the number of the persons, and the persons in the objects appearing on an image. The count unit 112 accumulates the number of appearances of objects in the images which are selected by the selection unit 114 and stored in the selected image storage unit 108. The calculation unit 113 evaluates the image and each object based on the composition of the object on the image and calculates points corresponding to the evaluation (an image evaluation unit and a person evaluation unit). The selection unit 114 selects a plurality of images used in the album based on the points calculated by the calculation unit 113 and the count result by the count unit 112. The layout unit 115 lays out the selected image on each page of the album. The printing unit 116 prints each laid-out page. The bookbinding unit 117 binds each printed page.

(Album Creation Process)

The general process of album creation in the present exemplary embodiment is described below. In the present exemplary embodiment, it is assumed that a picture is taken at a party and pictures used in the album to be distributed to party attendants are selected. In the present exemplary embodiment, points given to an image are calculated from the composition of an object. In the following description, a state where points P are given to an image "ImgK" is represented by "ImgK(P)". Also, in the following description, a state where an object X appears N times in a selected image set is represented by "X(N)".

The general process of album creation in the computer 100 is described below with reference to a flow chart in FIG. 2. In step S201, the computer 100 reads an image used in an album from the image storage unit 107. An example of the read image to be used in the album (input image set) is illustrated in FIG. 4A. As illustrated in FIG. 4A, the file names of the images in an input image set 401 are "Img1", "Img2", . . . , "Img9". Each image is provided with an object name (a full name) which appears in the images and information about the composition of each object as meta data. The object name is a personal name. The information about the composition of each object includes information about area related to the position of an entire person on an image, information about the size and the position of a face area, and information about the orientation of a face. The meta data may be previously attached to the read image or automatically attached thereto by image recognition or an analysis means.

In step S202, the computer 100 sets the number of pages of the album and the total number of images used in the album by user input via the operation unit 105. In step S203, the computer 100 prepares a list of objects 402 appearing on the album by user input and stores the list in the list storage unit 110. The list of objects 402 takes the form illustrated in FIG. 4B, for example, and includes personal names A, B, C, D, E, and F. For example, the list of objects 402 may be prepared using a list of attendants at a party or may be automatically prepared by the computer 100 by acquiring personal names in the input image set 401 through the meta data. Although in the present exemplary embodiment, an object is a person, an object may be a building. As illustrated in FIGS. 4C and 4D1, the meta data set to the images of Img1 to Img9 are the personal names A to F stored in the list of objects 402.

In step S204, the calculation unit 113 calculates points for each image of the input image set. The point calculation process for an image by the calculation unit 113 is described below using images in FIGS. 6A1 and 6A2 as an example. FIGS. 6B1 and 6B2 are examples illustrating information about composition added to the image. In FIG. 6B1, three persons are in line side by side: a person A at the left; a person B at the center; and a person C at the right. The person areas and the face areas corresponding to the three persons A, B, and C are represented by rectangles. The orientation of the face is represented using the position of a nose in the face area. The calculation unit 113 evaluates each object based on the position of an area in the object image.

In FIG. 6B1, the calculation unit 113 gives points 2 for the person A on the left in the image, points 3 for the person B at the center, and points 2 for the person C on the right. This is because the object at the center is highly evaluated as a chief object.

The calculation unit 113 evaluates each object based on the size of a face in the image. The calculation unit 113 gives point 1 to the size of face of the person A, points 2 for the size of face of the person B, and point 1 for the size of face of the person C. The calculation unit 113 gives point 1 to the orientation of face of the person A, point 1 to the orientation of face of the person B, and point 1 to the orientation of face of the person C. This is because the objects in the image are evaluated according to the size and the orientation of the face.

The calculation unit 113 sums up the points of the composition given to the objects in the image as the evaluation of the image. In FIG. 6B1, the sum of the points of the objects (=2+3+2+1+2+1+1+1+1=14 points) are taken as the evaluation of the image. The following describes the evaluation of an image, performed by the calculation unit 113, in which three persons are in line side by side: a person X who is not set in the list of objects is on the left; the person A is at the center; and the person B on the right, as illustrated in FIGS. 6A2 and 6B2.

Figure 2:
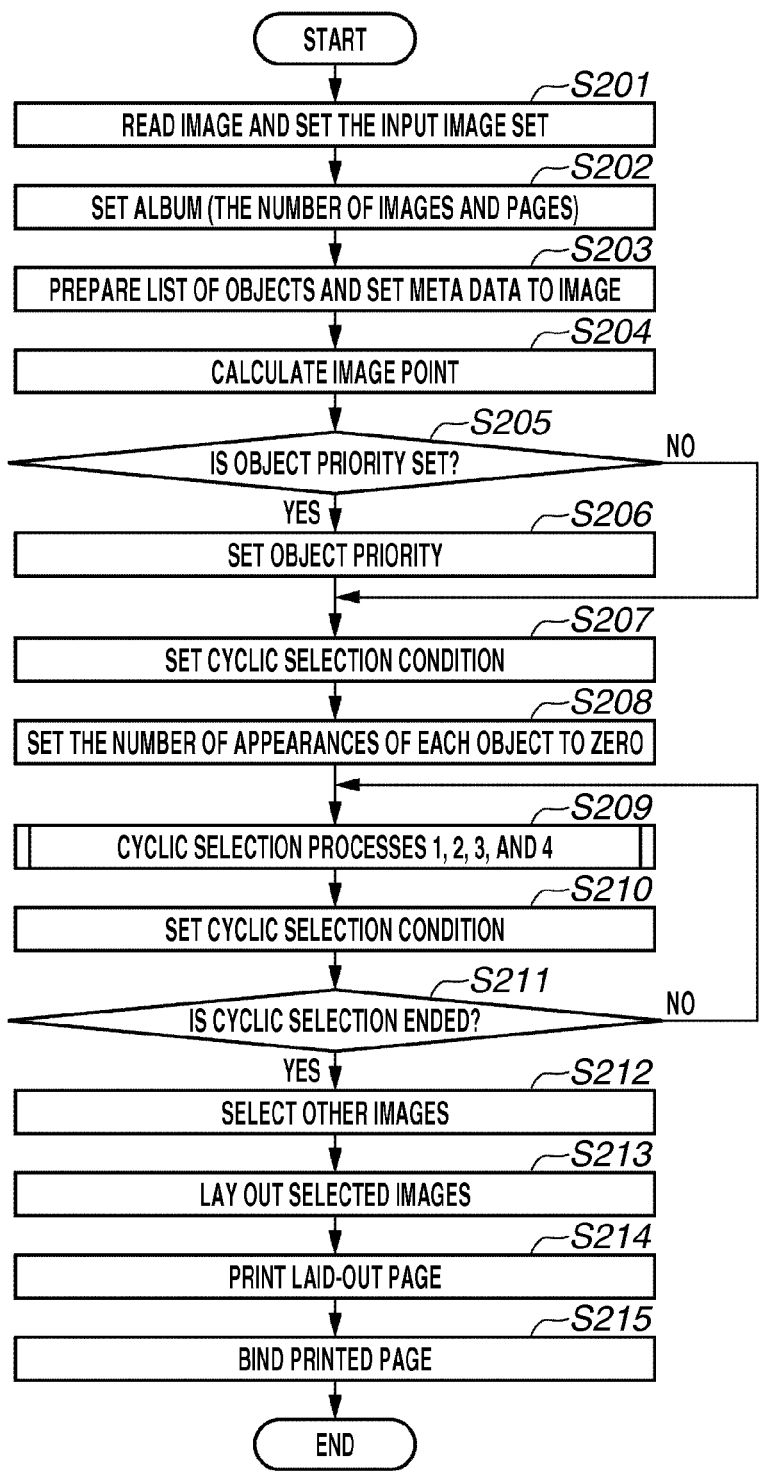
FIG. 2 is a flow chart illustrating the whole process of an album creation process.

When the three persons exist in an area illustrated in FIG. 6B2, the calculation unit 113 gives point 1 to the person X on the left, points 3 to the person A at the center, and points 2 to the person B on the right. The calculation unit 113 gives point 0 to the size of face of the person X, point 1 to the size of face of the person A, and point 1 to the size of face of the person B. The calculation unit 113 gives point 0 to the orientation of face of the person X, point 1 to the orientation of face of the person A, and point 1 to the orientation of face of the person B. This is because the image in which a large number of the objects set in the list are captured is highly evaluated. The sum of the points of the objects (=1+3+2+0+1+1+0+1+1=10 points) are taken as the point of the image of composition in FIG. 6B2.

Thus, the calculation unit 113 calculates points of each image of the input image set. It is assumed that the calculation unit 113 calculates the input image set 401 in FIG. 4A and acquires the results of Img1 (14), Img2 (10), Img3 (16), Img4 (7), Img5 (12), Img6 (8), Img7 (16), Img8 (13), and Img9 (15).

In step S205, the computer 100 determines whether an object priority is set based on the input of the user (priority setting unit). If the object priority is set (YES in step S205), the processing proceeds to step S206. If the object priority is not set (NO in step S205), the processing proceeds to step S207. In step S206, the computer 100 sets the priority of an object in an album to be created, or an object as a main subject based on the input of the user as an object priority setting. The process of the object priority setting is described in detail below.

In step S207, the computer 100 sets a cyclic selection condition. The term cyclic selection condition refers to a condition for selecting an image used in the album. For example, a condition is input that at least how many times each object in the list of objects appears on the album. In the present exemplary embodiment, the number of cyclic selections is set as RN=2, for example (an image is selected so that each object appears at least twice). The cyclic selection condition may be automatically set according to the number of images used in the album. In step S208, the count unit 112 sets the number of appearance of each object in the list of objects to zero as an initial value such as A(0), B(0), C(0), D(0), E(0), and F(0).

In step S209, the selection unit 114 executes any of cyclic selection processes 1 to 4. Each process of the cyclic selection processes 1 to 4 is described in detail below. In step S210, the cyclic selection condition is changed. In the present exemplary embodiment, for example, the number of cyclic selections RN is decremented (RN←RN−1). In step S211, it is determined whether cyclic selection is ended. In the present exemplary embodiment, for example, it is determined whether RN=0. If yes, (YES in step S211), the processing proceeds to step S212. Otherwise (NO in step S211), the processing returns to step S209.

In step S212, if the images selected in step S209 are insufficient for the number of images required according to the number of pages of the album and the number of images used in the album, the remaining images are selected. In step S213, the images selected until then are laid out on each page of the album. In step S214, each laid-out page is printed. In step S215, each printed page is bound into an album.

(Cyclic Selection Process 1)

The cyclic selection process 1 in step S209 is described below. The image that the selection process selects from the input image set is taken as a selected image. The set of the selected images is taken as a selected image set. The selected image is selected so that an object in the list of objects appears at least once to create the selected image set. An image is selected so that each object appears N times when the cyclic selection process 1 is repeated N times using the list of objects in the same cyclic image set.

The cyclic selection process 1 (step S209 in FIG. 2) is described in detail below with reference to a flow chart illustrated in FIG. 3. In step S301, the selection unit 114 sets the selected image set. If the first cycle of the cyclic selection process is performed, the selection unit 114 initializes the selected image set to clear the selected image set so that any image is not selected. In step S302, the selection unit 114 sets the cyclic image set, which is in addition subjected to the cyclic selection process from the input image set 401. The processing in step S302 may be omitted by subjecting all of the input image sets 401 to the cyclic selection process.

In step S303, an object subjected to the cyclic selection process is set based on the list of objects and a list of objects in the cyclic image is set. The processing in step S303 may be omitted by subjecting all objects in the list of objects to the cyclic selection process. In step S304, the selection unit 114 selects an image from images in the cyclic image set and takes the image as a selected image 405. In step S304, the selected image 405 is chosen by the following S1 and S2.

S1; all images including an object smallest in the number of appearances in the selected image set are selected from the cyclic image set and taken as an image set "SImgs". S2; an image greatest in points is selected from the image set "SImgs". If the points are equal, an image including the largest number of objects which are the smallest in the number of appearances is selected and taken as the selected image. In the present exemplary embodiment, in the S2, if there is a plurality of candidates of the selected image 405, an image including an object lying anterior to the list of objects in the cyclic image set 408 is preferentially taken as the selected image. In the S2, if there is a plurality of candidates of the selected image 405, one image is selected to which any priority is given.

In step S305, the count unit 112 increments the number of appearances in all selected images of an object appearing in the selected image to update the count value. In step S306, the computer 100 removes the image selected in step S304 from the cyclic image set. In step S307, the image selected in step S304 is added to the selected image set. In step S308, the computer 100 determines whether the objects in the list of objects in the cyclic image set appear the same number of times in the selected image set. If yes (YES in step S308), the processing is ended. Otherwise (NO in step S308), the processing returns to step S304.

An example is described below in which an image is selected by the cyclic selection process 1. In step S301, the selection unit 114 initializes the first cycle of the selected image set 403-1 to empty as illustrated in FIG. 4D2. In step S302, the selection unit 114 sets the cyclic image set 407 (Img1, Img2, . . . , Img9) illustrated in FIG. 7E1 within the input image set 401 (Img1, Img2, . . . , Img9) illustrated in FIG. 7E1. In this case, it is assumed that all the input image sets 401 are set to the cyclic image set 407. In step S303, A, B, C, D, E, and F are set from the list of objects as the list of objects in the cyclic image set as illustrated in FIG. 7E2. In step S304, the selection unit 114 selects an image by using the following S1 and S2.

S1; all images including an object smallest in the number of appearances in the selected image set are selected from the cyclic image set 407 (Img1 to Img9) and taken as an image set "SImgs". The selected image set is an initial value at present, so that the value of each object counted by the count unit 112 is A(0), B(0), C(0), D(0), E(0), and F(0). Then, the image set SImgs are all the cyclic image sets of Img1(14), Img2(10), Img3(16), Img4(7), Img5(12), Img6(8), Img7(16), Img8(13), and Img9(15).

S2; the selection unit 114 selects an image greatest in points from the image set SImgs. If there is a plurality of the images greatest in points, an image including the largest number of objects which are the smallest in the number of appearances is selected. In the selection unit 114, the first selected image has maximum points of 16 and is an Img7 including objects B(0), C(0), and D(0) which are the largest in number and the smallest in the number of appearances.

In step S305, the count unit 112 counts the number of appearances of each object. The number of appearances of each object at the stage of selecting the Img7 is A(0), B(1), C(1), D(1), E(0), and F(0). In step S306, the selected image is removed from the cyclic image set 407. Then, the cyclic image set 407 obtains Img1, Img2, Img3, Img4, Img5, Img6, Img8, and Img9. In step S307, the selected image (=Img7) is added to the selected image set.

In step S308, the computer 100 determines whether the objects in the list of objects=(A, B, C, D, E, and F) in the cyclic image set 408 appear once each in the selected image set. Since the objects appearing at this stage are B(1), C(1), and D(1), the processing returns to step S304. In step S304, the selection unit 114 performs selection similar to the above S1 and S2.

S1; all images including objects A(0), E (0), and F (0) which are the smallest in the number of appearances in the selected image set (Img7) are selected from the cyclic image set (Img1, Img2, Img3, Img4, Img5, Img6, Img8, and Img9). The selected image set is taken as SImgs. Then, the image set SImgs are Img1(14), Img2(10), Img3(16), Img5(12), Img6 (8), Img8(13), and Img9(15).

S2; an image greatest in points is selected from the image set SImgs. If the points are equal, an image including the largest number of objects which are the smallest in the number of appearances is selected and taken as the selected image. Then, the selected image has maximum points of 16 and is an Img3 including objects A(0) and B(0) which are the largest in number and the smallest in the number of appearances.

If processing is similarly repeated and images are selected so that all the objects appear at least once, the selected image set becomes Img7(16), Img3(16), Img9(15), and Img8(13) (refer to 403-1 in FIG. 7F1). Thus, the first cycle of the cyclic selection process 1 is ended. If an image should be used in which each object appears at least twice on the album, the second cycle of the cyclic selection process 1 is performed. The selected image set in the second cycle of the cyclic selection process 1 is Img2(10) (refer to FIG. 7F2). A selected image set can be made for another cycle 403-4 (refer to FIG. 7F3). In the first and second cycles of selection, a total number of selected images is five. The number of appearances of each image at this time is A(2), B(4), C(2), D(2), E(2), and F(2) (refer to FIG. 7G). As described above, according to the cyclic selection process 1, an image is evaluated based on the composition of each object and a highly evaluated image is used to select an image in which each object evenly appears.

Below is described the processing in step S211 and the subsequent steps after the above cyclic selection process 1 in step S209 of FIG. 2 is ended. In step S211, if the computer 100 determines that the cyclic selection process is ended, in step S212, if the number of images set in step S202 does not reach the number of images selected by the cyclic selection process 1, the remaining images are selected in descending order of points. In this case, a photographic set 403-A6 (Img3, Img7, Img9, Img8, Img2, and Img1), for example, illustrated in FIG. 7H3 is selected. Various other types of sets may alternatively be selected, such as photographic sets 403-A4 or 403-A5 illustrated in FIGS. 7H1 and 7H2. Reference numerals having similar meanings to those described above are also are utilized in FIGS. 9A1-9E3, 10F1-10J3, 12A1-12D3, 13E1-13H4, 14I1-14K3, 16A-16D2, 17A-17D2, 18A-18C3, 19A1-19A5, and 20B1-20B5.

(Effect of the First Exemplary Embodiment)

Thus, points given to an image is calculated by weighting each item of information about the composition of an object. Thus, a photographic set is created such that photographs having a composition of high points are selected and all objects appear at least once. Further, a photographic set in which photographs having a composition of high points are selected and all objects appear as evenly as possible can be created using a small number of photographs. In other words, the points of a photograph are calculated from object information including composition information attached to the photograph, and a photograph of an object having appropriate composition is preferentially selected. At the same time, a photograph can be selected so that the number of objects can be appropriate according to the purpose, using information about the object of the photograph. For example, all persons can appear in an album at least a predetermined number of times.

(Cyclic Selection Process 2)

In a second exemplary embodiment, a cyclic selection process 2 is described. In the cyclic selection process 2, the points of an image other than the selected images including the same object as that included in the selected images are decreased by a certain number. Furthermore, an image is selected such that a person appears in the selected image as infrequently as possible. Accordingly, different persons appear, and each object evenly appears. The point that the second exemplary embodiment differs from the first exemplary embodiment is described in detail below.

Figure 8:
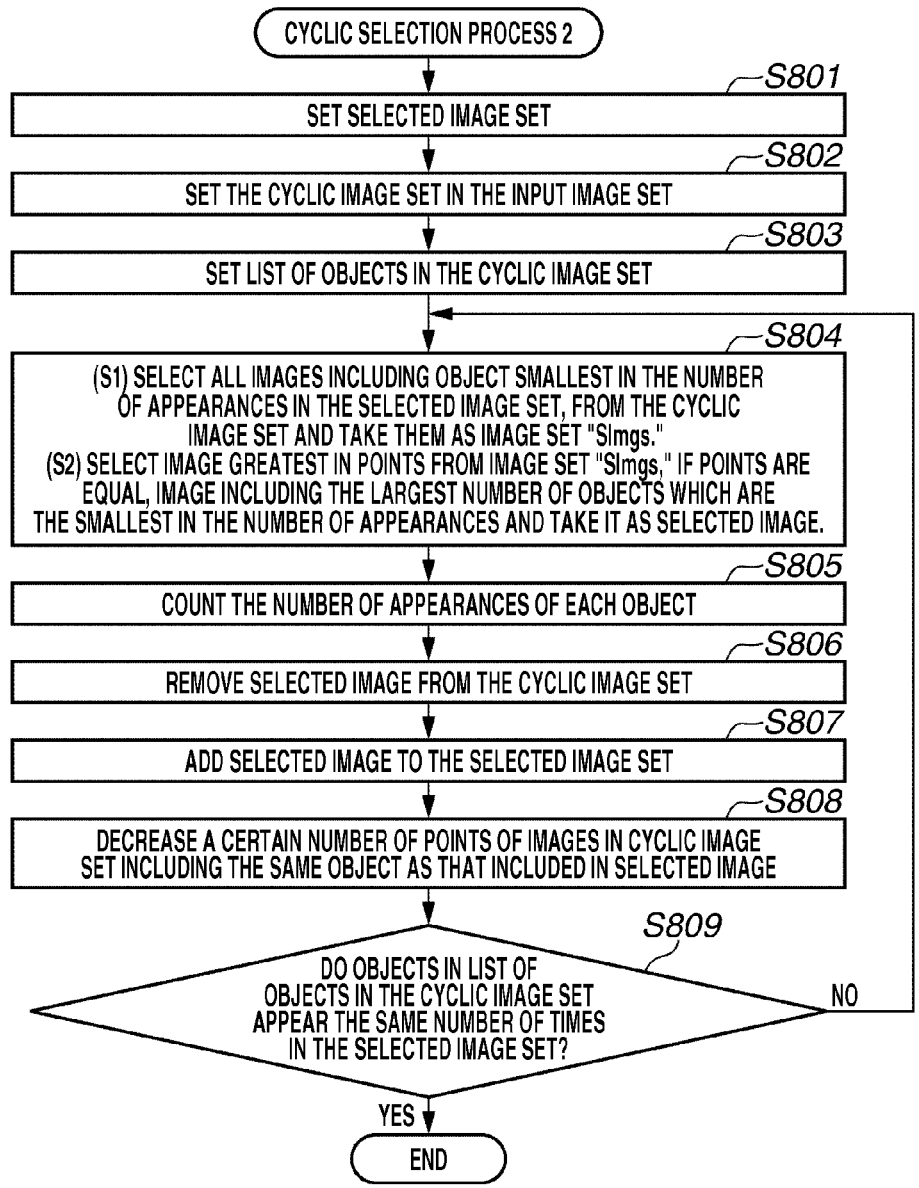
FIG. 8 is a flow chart illustrating a cyclic selection process 2.

The cyclic selection process 2 in step S209 in FIG. 2 is described below with reference to a flow chart illustrated in FIG. 8. Steps in S801 to S807 are similar to steps S301 to S307 in the cyclic selection process 1, so that the description thereof is omitted. In step S808, the calculation unit 113 decreases a certain number of points (two points, in this case) of images in the cyclic image set including the same objects as those (B, C, and D) included in the selected image (=Img7). Then, the points of Img2, Img3, and Img9 including B in the images in FIG. 9A2 are decreased by two. The points of Img4 and Img8 including C are decreased by two. The points of Img5 and Img8 including D are decreased by two. As a result, the points of the images in the cyclic image set become Img1(14), Img2(8), Img3(14), Img4(5), Img5(10), Img6(8), Img8(9), and Img9(13) as illustrated in FIG. 9B2.

In step S809, the selection unit 114 determines whether the objects A, B, C, D, E, and F in the list of objects in the cyclic image set 408 appear once in the selected image set. Since the number of appearances of each object is A(0), B(1), C(1), D(1), E(0), and F(0) at that time, the objects A, E, and F do not yet appear (NO in step S809). Then, the processing returns to step S804. Steps S804 to S809 are repeated until it is determined to be YES in step S809. Then, the following selected image is Img3.

The selected image set when the selection unit 114 selects the second image is illustrated in FIG. 9C1. The cyclic image set 407 is illustrated in FIG. 9C2. The calculation unit 113 lowers the evaluation of images in the cyclic image set including the objects appearing in the Img3.

The selection unit 114 selects the Img5 as the next selected image 405 in accordance with the standards of S1 and S2. The selected image set is then illustrated in FIG. 9D1. The cyclic image set 407 is then illustrated in FIG. 9D2. The calculation unit 113 lowers the evaluation of images in the cyclic image set including the objects appearing in the Img5.

The following selected image is Img6. The selected image set is illustrated in FIG. 9E1. The cyclic image set 407 is illustrated in FIG. 9E2. The number of appearances of each object at that time is counted to be A(1), B(2), C(1), D(2), E(1), and F(1) as illustrated in FIG. 9E3. In step S809, the selection unit 114 determines that the objects in the list of objects in the cyclic image set 408 has appeared once and the first cycle of the cyclic selection process 2 is ended. The second cycle of the cyclic selection process 2 is similarly performed to select the images Img1, Img2, Img4, and Img9 as illustrated in FIG. 10. The number of appearances of each object at that time is A(3), B(4), C(2), D(2), E(2), and F(2) as illustrated in FIG. 10(*i*3). In step S809, the selection unit 114 determines that the objects A, B, C, D, E, and F in the list of objects in the cyclic image set have appeared twice and the second cycle of the cyclic selection process 2 is ended.

(Effect of the Second Exemplary Embodiment)

Figure 3:
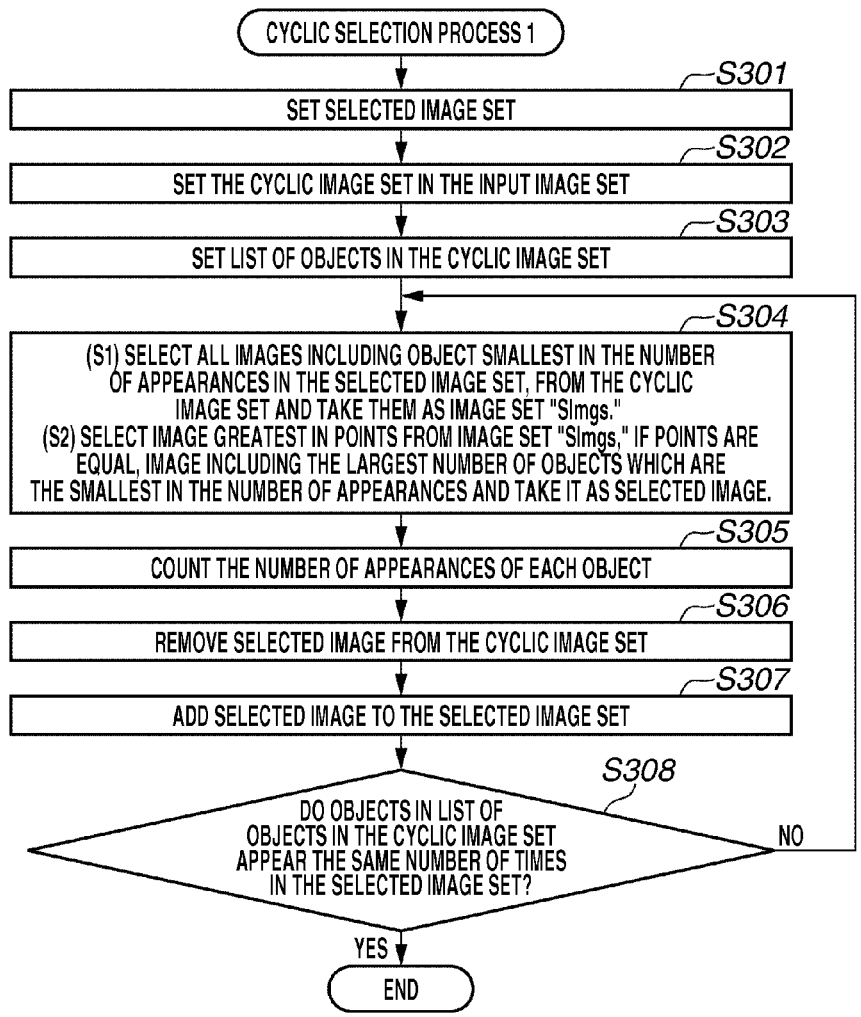
FIG. 3 is a flow chart illustrating a cyclic selection process 1.

In the present exemplary embodiment, at the stage where the first-cycle selection is ended, the number of appearances of each object is A(1), B(2), C(1), D(2), E(1), and F(1) as illustrated in FIG. 9E3. Specifically, in the present exemplary embodiment, the points of a photograph including the same object as that included in the selected photograph is decreased to decrease the number of times of redundantly selecting the same object in the same selected image set. Therefore, images fewer in number which have a composition having high points, and in which all the objects more evenly appear can be selected for the album distributed to the user.

(Cyclic Selection Process 3)

In a third exemplary embodiment, a cyclic selection process 3 is described below. In the cyclic selection process 3, if a specific object is selected more times than any other at the stage of selecting an image, the image including the object selected more times is removed from the selected image set. In the following description, the image removed at that time is referred to as "return image". The point that the third exemplary embodiment differs from the first exemplary embodiment is described in detail below.

The cyclic selection process 3 in step S209 in FIG. 2 is described below with reference to a flow chart illustrated in FIG. 11. Steps in S1101 to S1107 are similar to steps S301 to S307 in the cyclic selection process 1, so that the description thereof is omitted. The selection unit 114 selects the Img7 as a selected image. In step S1108, the count unit 112 counts the number of appearances of an object and the selection unit 114 determines whether there is an image which can be returned (=the return image 406) from the selected image set to the cyclic image set based on the result. The determination is made based on the following R1 to R3.

R1; it is assumed that a N1-th cyclic selection process is being performed at present. R2; it is assumed that the set of objects appearing the (N1+1) number of times is taken as Gr (N1+1). R3; if all objects included in an ImgB (ImgB ⊂ selected image set) are included in Gr (N1+1), the ImgB is taken as the return image. The number of appearances of an object at present is A(0), B(1), C(1), D(1), E(0), and F(0) as illustrated in FIG. 12B3. Then, N1=1 in the R1. Gr(N1+1(=2)) in the R2 is an empty set. Therefore, the return image does not exist in the R3. At this stage, the selection unit 114 determines that there is no return image. If the determination is affirmative (YES in step S1108), the processing proceeds to step S1109. If the determination is negative (NO in step S1108), the processing proceeds to step S1110.

In step S1110, it is determined whether each of the objects in the list of objects in the cyclic image set appears the same number of times in the selected image set. If the determination is affirmative (YES in step S1110), the processing is ended. If the determination is negative (NO in step S1110), the processing returns to step S1104.

The computer 100 similarly repeats the processing and selects the Img3 (16) as the next selected image. In step S1108, the count unit 112 counts the number of appearances of an object and the selection unit 114 determines whether there is an image which can be returned from the selected image set to the cyclic image set based on the result. Since the determination made according to the R1 to R3 is negative (NO in step S1108), the processing proceeds to step S1110. In step S1110, it is determined whether each of the objects A to F appears at least once. Since the number of appearances of each image at present is A(1), B(2), C(1), D(1), E(0), and F(0), the determination is negative (NO in step S1110), so that the processing returns to step S1104. The selection unit 114 similarly repeats the processing and selects the Img9 (15) as the next selected image.

In step S1108, the count unit 112 counts the number of appearances of an object and the selection unit 114 determines whether there is an image which can be returned from the selected image set to the cyclic image set based on the result. The determination is made according to the R1 to R3. N1=1 in the R1. Gr(N1+1(=2)) in the R2 is A and B. Therefore, the Img3 exists as the return image 406 in the R3. For this reason, the determination becomes affirmative (YES in step S1108), the processing proceeds to step S1109. In step S1109, the return image 406 (=Img3) is returned from the selected image set 403-1 to the cyclic image set 407.

Then, the selected image set 403-1 can be illustrated in FIG. 13E1 and the cyclic image set 407 can be illustrated in FIG. 13E2. The processing returns to step S1104 via steps S1108 and S1110. In step S1104, the image 405 (=Img8(13)) is selected. In the subsequent steps, the above processing is repeated, the selected image set 403-1 becomes as illustrated in FIG. 13G1, and the first cycle of the cyclic selection process 3 is ended. Similarly, if the second cycle of the cyclic selection process 3 is performed, the selected image set becomes as illustrated in FIG. 14J1 and the number of appearances of each object in each image is represented by A(2), B(4), C(2), D(2), E(2), and F(2), so that it is determined to be YES, therefore, the second cycle of the cyclic selection process 3 is ended.

(Effect of the Third Exemplary Embodiment)

In the present exemplary embodiment, at the stage where the first-cycle selection is ended, the number of appearances of each object is A(1), B(1), C(1), D(1), E(2), and F(1) as illustrated in FIG. 13G3. More specifically, if the object included in the photograph set selected during selection of images particularly more frequently appears than other objects, the selection of the image in which the object particularly more frequently appears, while all objects appear at least a predetermined number of times, is cancelled from the selected photograph. Thus, the photograph set (Img9 and Img8) illustrated in FIG. 13G1 in which photographs are smaller in number than those in the second exemplary embodiment and the composition is high in points, and all objects appear as evenly as possible, can be created as the album distributed to the user. By cancelling the selection of the image selected once, the image used in the album can be selected so that all persons appear a predetermined number of times in fewer photographs.

(Cyclic Selection Process 4)

In a fourth exemplary embodiment, a cyclic selection process 4 is described. In the cyclic selection process 4, a certain number of points of an image other than a selected image including the same objects as those included in a selected image is decreased. In the process of image selection, in the selected image set, if a specific object (a specific person) is selected more frequently than other objects, the image including the object selected more frequently is removed from the selected image set (cancel unit).

The cyclic selection process 4 in step S209 in FIG. 2 is described below with reference to a flow chart illustrated in FIG. 15. Steps in S1501 to S1507 are similar to steps S301 to S307 in the cyclic selection process 1, so that the description thereof is omitted. In step S1508, points (=D) of images in the cyclic image set 407 including the same object as that included in the selected image 405 is decreased by a certain number. In step S1509, it is determined whether there is an image which can be returned (=the return image 406) from the selected image set to the cyclic image set based on the result of counting the number of appearances of an object according to the R1 to R3. If the determination is affirmative (YES in step S1509), the processing proceeds to step S1510. If the determination is negative (NO in step S1509), the processing proceeds to step S1512.

In step S1510, the return image 406 is returned from the selected image set to the cyclic image set 407. In step S1511, points of other images decreased when adding the return image to the selected image set as the selected image are returned to initial values. If n objects which are added to the selected image set after the return image is added to the selected image set and included in an image are included in the return image, points of the retune image are decreased by Dn. The processing returns from step 1511 to step 1509. In step S1512, it is determined whether each of the objects in the list of objects in the cyclic image set appears the same number of times in the selected image set. If the determination is affirmative (YES in step S1512), the cyclic selection process 4 is ended. If the determination is negative (NO in step S1512), the processing returns to step S1504.

(Effect of the Fourth Exemplary Embodiment)

In the present exemplary embodiment, points of the photograph including the same object as that included in the selected photograph are decreased, so that the redundant selection of the same object in the same selected image set is decreased. If the object included in the photograph set selected during selection of images particularly more frequently appears than other objects, photographs which can be removed while the combination of objects is maintained are searched and removed from the selected photographs. In other words, selection is cancelled as an image used in the album. Thus, the photograph set in which photographs are small in number and the composition is high in points, and all objects appear as evenly as possible can be created as the album distributed to the user.

(Object Priority Setting (with C as Main Subject))

In a fifth exemplary embodiment, an example is described, in which an object is set as a main subject, and an image is selected so that much more objects as main subjects appear in an object priority setting for the album creation process (in step S206 of FIG. 2). An example in which an image used in the album is selected with the object C as a main subject is described below with reference to FIGS. 16A through 16D2.

In FIG. 2, the object priority is set (YES in step S205) and, in step S206, the computer 100 sets the object priority. At the stage where the image-point calculation process (in step S204 in FIG. 2) is ended, it is assumed that the image is given points as illustrated in FIG. 7E1. In step S206, if the object C is set as a main subject, the calculation unit 113 adds +10 points to increase the evaluation of the image including the object C in the input image set 1 as illustrated in FIG. 16A.

The calculation unit 113 performs the cyclic selection process 1 (in FIG. 3) five times. In the first three cyclic selection processes 1, the list of objects in the cyclic image set is set to C. In the next two cyclic selection processes 1, the list of objects in the cyclic image set is set to A, B, C, D, E, and F. This is because, while the larger number of appearances of an object as a main subject is selected, the number of appearances of other objects is also to be equalized.

In the first cyclic selection process 1, the list of objects in the cyclic image set is C, so that the selected image set 403-C1 becomes Img7 as illustrated in FIG. 16B1. In the second cyclic selection process 1, the list of objects in the cyclic image set is C, so that the selected image set 403-C2 becomes Img8 as illustrated in FIG. 16B2. In the third cyclic selection process 1, the list of objects in the cyclic image set is C, so that the selected image set 403-C3 becomes Img4 as illustrated in FIG. 16B3. In the fourth cyclic selection process 1, the list of objects in the cyclic image set is A, B, C, D, E, and F, so that the selected image set 403-1 becomes Img3 as illustrated in FIG. 16C1. In the fifth cyclic selection process 1, the list of objects in the cyclic image set is A, B, C, D, E, and F, so that the selected image set 403-2 becomes Img9 and Img2 as illustrated in FIG. 16D1.

(Effect of the Fifth Exemplary Embodiment)

The present exemplary embodiment is effective to create the photograph set used in the album to be distributed to the object C. In this case, the photograph sets Img7, Img8, and Img4 in which the object C appears and the composition is high in points as illustrated in FIGS. 16B1, 16B2, and 16B3 can be preferentially selected. Another photograph set Img3 is selected in FIG. 16C1. Thus, Img7, Img8, Img4, and Img3 are selected as the photograph set for the album distributed to the object C. At this point, the number of appearances of each object is A(1), B(2), C(3), D(2), E(1), and F(1). Thus, the photograph set can be created in which the specific object C is selected many times and other objects appear as evenly as possible.

(Object Priority Setting (with A and B as Main Subject))

In a sixth exemplary embodiment, an example is described in which images used in the album are selected with the objects A and B as a main subject with reference to the flow chart of the album creation process in FIGS. 2 and 17A-17D2. In the present exemplary embodiment, in the object priority setting for the album creation process (in step S206 of FIG. 2), the objects A and B are set as a main subject. Also, in the present exemplary embodiment, the cyclic selection process 1 (FIG. 3) is performed five times. In the first three cyclic selection processes 1, the list of objects in the cyclic image set is set to A and B. In the next two cyclic selection processes 1, the list of objects in the cyclic image set is set to A, B, C, D, E, and F. The setting and change of the cyclic selection conditions are performed in steps S207 and S210.

In step S205, "YES" is selected and the object priority is set in step S206. In step S211, it is determined that the cyclic selection is ended. At the stage where the image point calculation process (in step S204 of FIG. 2) is ended, images are assumed to be given points as illustrated in FIG. 7E1. If the objects A and B are set as a main subject in step S206, points of the image including the objects A or B in the input image set 1 are each assumed to be given +10 as illustrated in FIG. 17A.

In the first cyclic selection process 1, the list of objects in the cyclic image set is A and B, so that the selected image set 403-AB1 becomes Img3 as illustrated in FIG. 17B1. In the second cyclic selection process 1, the list of objects in the cyclic image set is A and B, so that the selected image set 403-AB2 becomes Img9 as illustrated in FIG. 17B2. In the third cyclic selection process 1, the list of objects in the cyclic image set is A and B, so that the selected image set 403-AB3 becomes Img7 and Img1 as illustrated in FIG. 17B3. In the fourth cyclic selection process 1, the list of objects in the cyclic image set is A, B, C, D, E, and F, so that the selected image set 403-1 becomes Img2 as illustrated in FIG. 17C1. In the fifth cyclic selection process 1, the list of objects in the cyclic image set is A, B, C, D, E, and F, so that the selected image set 403-2 becomes Img8 as illustrated in FIG. 17D1.

(Effect of the Sixth Exemplary Embodiment)

The present exemplary embodiment is applicable when the photograph set used in an album is created in which the objects A and B are a bride and a groom and which is distributed at the wedding reception, for example. In this case, as illustrated in FIGS. 17B1, 17B2, and 17B3, the photographs Img3, Img9, Img7, and Img1 in which the objects A and B appear and which are high in points are preferentially selected. Another photograph of Img2 is selected as illustrated in FIG. 17C1. Then, the number of appearances of each object is A(3), B(4), C(1), D(1), E(1), and F(1) as illustrated in FIG. 17C2. Thus, the photograph set can be created in which the objects A and B in particular appear many times and the other attendants evenly appear.

(Object Priority Setting (Priority is Set to Objects A to F)

In a seventh exemplary embodiment, an example is described below in which priority is set to the objects A to F and images used in an album are selected, with reference to FIG. 18. According to the present exemplary embodiment, in the object priority setting of the album creation process (in step S206 of FIG. 2), priority is set to all the objects A to F.

At the stage where the image point calculation process (in step S204 of FIG. 2) is ended, images are assumed to be given points as illustrated in FIG. 7E1. If the objects A to F are set to priority, points +5 are given to each image including the object A in the input image set 1 as illustrated in FIG. 18A (which is indicated as A(+5)). Similarly, as a result of setting the priority, the objects B(+5), C(+10), D(+20), E(+0), and F(+15) are given. This is because an image including an object higher in priority is more highly evaluated.

In the present exemplary embodiment, an image is selected using the cyclic selection process 1 in step S209. In the first cycle of the cyclic selection process 1, the selected image set 403-1 becomes Img8, Img7, and Img3 as illustrated in FIG. 18B1. In the second cycle of the cyclic selection process 1, the selected image set 403-2 becomes Img2, Img5, and Img9 as illustrated in FIG. 18B2. If remaining images are selected in step S212, the remaining selected image set 403-3 becomes Img6, Img1, and Img4 as illustrated in FIG. 18B3.

(Effect of the Seventh Exemplary Embodiment)

In the present exemplary embodiment, by setting priority to an object, the points of a photograph in which an object high in priority appears, are increased. This can create a photograph set in which an object having high priority appears many times.

(Evenly Selecting Image from Each Shooting Time Frame)

In an eighth exemplary embodiment, a plurality of the cyclic image sets (group) classified for each shooting time frame is formed from a partial set of the input image set and the list of objects in the cyclic image set is configured within the cyclic image set formed for each shooting time frame (hereinafter, represented by an event 1, event 2, . . . ). The cyclic selection process 1 is repetitively applied to select images.

As illustrated in FIG. 19A1, cyclic image sets 407-1 and 407-2 are configured within the input image set 401 (classification unit). Herein, the cyclic image set 407-1 is assumed to be formed of the image of the event 1 and the cyclic image set 407-2 is assumed to be formed of the image of the event 2. In the first two cyclic selection processes 1, the cyclic image set 407-1 is set to Img1, Img2, Img3, Img4, and Img5 and the list of objects in the cyclic image set 408 is set to A, B, C, D, E, and F. Then, in the first cyclic selection process 1, the selected image set 403-E11 becomes Img3, Img5, Img2, and Img4 as illustrated in FIG. 19A2. In the second cyclic selection process 1, the selected image set 403-E12 becomes Img1 as illustrated in FIG. 19A3.

In the last two cyclic selection processes 1, the cyclic image set 407-2 is set to Img6, Img7, Img8, and Img9 and the list of objects in the cyclic image set 408 is set to A, B, C, D, E, and F. Then, in the third cyclic selection process 1, the selected image set 403-E21 becomes Img7, Img9, and Img8 as illustrated in FIG. 19A4. In the fourth cyclic selection process 1, the selected image set 403-E22 becomes Img6 as illustrated in FIG. 19A5.

In the eighth exemplary embodiment, the read photographs is classified for each shooting time frame and selected for each shooting time frame as evenly as possible to create the photograph set used in the album. Furthermore, the photograph set is selected so that objects appear as evenly as possible in each shooting time frame to create the photograph set used in the album. Therefore, images can be selected in which each object shows superior composition and each object appears once or more for each event. In other words, a plurality of images is classified into groups and at least one image in each group can be selected as an image used in the album.

(Even Selection of Image from Each Shooting Location)

In a ninth exemplary embodiment, a plurality of the cyclic image sets classified for each shooting location is formed of a partial set of the input image set and the list of objects in the cyclic image set is configured within the cyclic image set formed for each shooting location. The cyclic selection process 1 is repetitively applied to select images.

As illustrated in FIG. 20B1, the cyclic image sets 407-1 to 407-3 are configured within the input image set 401. The cyclic image sets 407-1, 407-2, and 407-3 are assumed to be formed of shooting locations 1, 2, and 3 respectively. In the first cyclic selection process 1, the cyclic image set 407-1 is set to Img1, Img2, and Img3 and the list of objects in the cyclic image set 408 is set to A, B, and F. Then, the selected image set 403-P11 becomes Img3 and Img2 as illustrated in FIG. 20B2.

In the second cyclic selection process 1, the cyclic image set 407-2 is set to Img4, Img5, Img6 and Img7 and the list of objects in the cyclic image set 408 is set to B, C, D, E, and F. Then, the selected image set 403-P21 becomes Img7, Img5 and Img6 as illustrated in FIG. 20B3. In the third cyclic selection process 1, the cyclic image set 407-3 is set to Img8, and Img9 and the list of objects in the cyclic image set 408 is set to A, B, C, D, E, and F. Then, the selected image set 403-P31 becomes Img9 and Img8 as illustrated in FIG. 20B4. The remaining selected image set 403-P41 becomes Img1 and Img4 as illustrated in FIG. 20B5.

(Effect of the Ninth Exemplary Embodiment)

In the present exemplary embodiment, the read photographs is classified for each shooting location and selected for each shooting location as evenly as possible to create the photograph set used in the album. Furthermore, the photograph set is selected so that objects appear as evenly as possible in each shooting location to create the photograph set used in the album. Therefore, images can be selected in which each object shows superior composition and each object appears once or more for each location.

In a tenth exemplary embodiment, an example is described in which images are selected in consideration of a balance between objects as a whole album. In a following case, a photograph is taken at a party similarly to the one in the second exemplary embodiment in consideration of composition, and photographs to be used in an album distributed to the attendants of the party are selected. In the present exemplary embodiment, points for each object of each image is calculated from the composition of the object.

Figure 21:
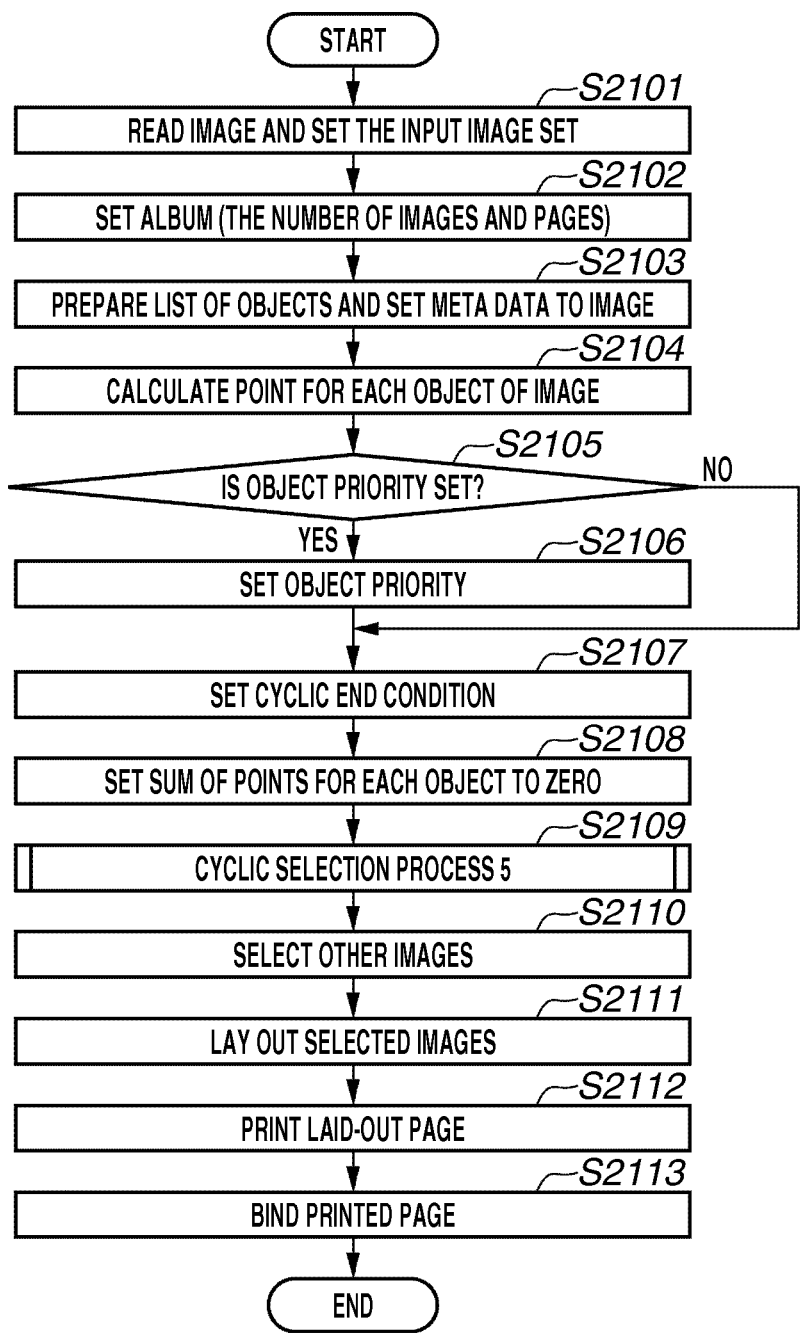
FIG. 21 is a flow chart illustrating the whole process of the album creation process.

The present exemplary embodiment is described with reference to flow charts of FIGS. 21 and 22. In step S2101, the computer 100 reads images and an input image set 2301 is set to Img1 to Img12 (refer to FIG. 23A). Meta data attached to each image are object names and information about the composition of objects. The object names are personal names and the information about the composition of objects includes information about the area of the entire person, information about a face area, and information about points of each object in the area. For example, meta data having information about points as illustrated in FIG. 24B1 are attached to an image illustrated in FIG. 24A1. Furthermore, meta data having information about points as illustrated in FIG. 24B2 are attached to an image illustrated in FIG. 24A2. Similarly, meta data having information about points as illustrated in FIG. 24B3 are attached to an image illustrated in FIG. 24A3. Meta data having information about points as illustrated in FIG. 24B4 are attached to an image illustrated in FIG. 24A3.

Herein, there are illustrated four types of compositions: a composition A1 including three persons at the center and both sides; a composition A2 including two persons; a composition A3 of a close-up of a face; and a composition A4 of one person; and information about points corresponding thereto. Actually, however, a composition including a far larger number of persons and a different composition of an object may be set along with information about points.

In step S2102, the computer 100 sets the number of pages to be created and the number of images to be used. In step S2103, a list of objects 2302 of A, B, C, D, E, and F is set (refer to FIG. 23B) and meta data is given to the images in an input image set 2301 for each object (refer to FIG. 23C). As a result, in step 2104, the calculation unit 113 calculates points for each object of an image. Points for an image are calculated from meta data illustrated in FIGS. 24B1 and 24B2 using points corresponding to a position of information about the composition of an object.

As illustrated in FIG. 24B1, for example, it is assumed that a person A is at the left, a person B is at the center and a person C is at the right and all three persons are from the waist up, side by side, and full-faced. In this case, when the three persons exist in an area illustrated in FIG. 24B1 in the image, points in which the person A is at the left are taken as 1, points in which the person B is at the center are taken as 2, and points in which the person C is at the right are taken as 1.

The points of the images in the composition as illustrated in FIG. 24B1 are separately aggregated like point 1 of the person A, points 2 of the person B, and point 1 of the person C. For example, as illustrated in FIG. 24B2, if the persons A and B stand side by side, two points are aggregated for the persons A and B. Similarly, in FIG. 24B3, the person B shows up in a single and a close-up view, so that five points are given to the person B. In FIG. 24B4, on the other hand, the person A is a single, but, a somewhat small standing image, so that three points are given to the person A.

Points of each image in the input image set 2301 are calculated using such a method in order to determine the points of each object of each image. If a priority of selecting an object is not given (NO in step S2105), the processing proceeds to step S2107. If a priority of selecting an object is given (YES in step S2105), the points determined in FIG. 23D1 as to a person whose priority should be raised are uniformly multiplied by one or less to decrease the points, which allows raising of the priority. In step S2107, the computer 100 sets the lower limit of the sum of points of objects with respect to images selected for the album. The lower limit is the end condition for the cyclic selection process.

The end condition is determined based on the sum of points (in FIG. 23D1) of the images calculated in step S2104 and the number of the objects registered in the list of objects (in FIG. 23B). For example, the end condition is set to a value smaller than the average value (about 6.17) of points per object (person) calculated above and is set to be 6 in the present exemplary embodiment. In step S2108, the sum of points of the objects with respect to the images selected for the album from each image is set to zero prior to the start of the selection. In step S2109, a first cycle of image selection is performed by the cyclic selection process 5.

When the cyclic selection process 5 (in step S2109 of FIG. 21) in FIG. 22, in step S2201, the selected image set 2303-1 (in FIG. 23D2) is cleared to be empty. In step S2202, the cyclic image set 2507 which is a partial set of the input image set 2501 (FIG. 25E) is set to the inside of the input image set 2501. In step S2203, the list of objects 2302 within the cyclic image set is set. In step 2204, an image is selected from images within the cyclic image set 2507 and taken as a selected image. In step 2204, the selected image is selected by the following S1 and S2.

The S1; an object which is the smallest in the sum of points is extracted from the list of objects 2302. In the first cycle, the selected image set 2303-1 is cleared to be empty, so that all of the sum of points for each object is point 0. In other words, in the S1, all objects are extracted. The S2; the image which is the highest in points is selected for each of the objects extracted in the S1 as a selected image from the cyclic image set.

FIG. 25G1 illustrates images selected for each object in each cycle and points of each object modified along with the selection. In the present exemplary embodiment, in the S2, Img1 with points 5 and Img4 with points 3 are selected for the objects A and B respectively. Similarly, Img2, Img5, Img3, and Img6 are selected for the objects C to F. In 2504-1 of FIG. 25G1, an image on which a numeral corresponding to an object is written indicates the selected image and points, and a parenthesized numeral indicates points acquired along with the selected image by another object. If there is a plurality of candidates of the selected images with the same points, an image including an object in front of the cyclic image set yet to be selected is preferentially selected.

In step S2205, points acquired by each object from the selected image are aggregated. In 2504-1 of FIG. 25G1, the numerals arranged on the extreme right indicate the sum of points for each object acquired by circulation. In step S2206, the selected image is removed from the cyclic image set 2507 and the cyclic image set 2507 becomes the next cyclic image set. In step S2207, the selected image is added to the selected image set 2303-1. In step S2208, it is determined whether the cyclic image set is empty. If the cyclic image set is empty (YES in step S2208), circulation is ended. If the cyclic image set is not empty (NO in step S2208), in step S2209, it is determined whether the points of all objects exceed the value set in step S2107.

If the points exceed the value (YES in step S2209), the circulation is ended and the processing returns to step S2110.

If the points of all objects do not exceed the set value (NO in step S2209), the processing returns to step S2204 and performs the next cyclic process. In other words, in the first circulation, the points indicated in the table 2504-1 in FIG. 25G1 are aggregated and an image indicated in 2505-1 in FIG. 25H1 is selected. Thereafter, in the second circulation, points 2504-2 and an image 2505-2 in FIGS. 26G2 and 26H2 are selected. In the third circulation, points 2504-3 and an image 2505-3 in FIGS. 26G3 and 26H3 are selected.

As a result of the third circulation, points for each object indicated on the extreme right of the table 2504-3 indicate four to seven. Accordingly, in step S2209 at the third circulation, it is also determined that the points of all objects do not exceed the set value, and the fourth circulation is started. FIGS. 5F4, 5G4, and 5H4 are diagrams illustrating image selection in a cyclic selection process 5. A cyclic image set 2503-4 is illustrated in FIG. 5F4. In the fourth circulation, points 2504-4 and an image 2505-4 in FIGS. 5G4 and 5H4 are selected. The points of all objects exceed six which is the value of the end condition set in step S2107, so that the circulation process in FIG. 22 is ended. As a result, the images Img1 to Img9 are selected in the selected image set 2303-1.

In the present exemplary embodiment, the example is described in which all input images being candidates to be selected are selected. However, the end condition can be appropriately set to select the number of images used in the album from a large number of images. Thereafter, in step S2110, if the pages in the album set in step S2102 is not filled with the selected image set, other images are selected in order or at random from images which have not been selected.

In step S2111, a layout process for properly applying the selected images to the album is performed. Various processes are available in the layout process, but detailed description is omitted. In steps S2112 and S2113, print processing and bookbinding processing are performed to complete creation of the album.

(Effect of the Tenth Exemplary Embodiment)

As described above, according to the present exemplary embodiment, images can be selected based on information about the composition of an object of each image in selecting images used in the album. If an image with an object having composition in which one person or a small number of persons is photographed is selected, fewer images having other compositions are selected. With respect to an object which is always photographed at the edge portion, images to be selected are increased to realize the selection of well-balanced images in the album. Further, with respect to a large number of objects having images of a composition in which one person or a small number of persons is photographed, an image high in points is selected to improve the quality of the album.

(Other Exemplary Embodiments)

The present exemplary embodiment can be realized by executing the following process. Software (program) realizing the functions of the above exemplary embodiments is applied to a system or an apparatus via a network or various storage media, such as a non-transitory storage medium, and a computer (or a central processor unit (CPU), a microprocessor unit (MPU), or the like) of the system or the apparatus reads and executes the program.

While the claimed invention has been described with reference to exemplary embodiments, it is to be understood that the claimed invention is not limited to the disclosed exemplary embodiments. The scope of the following claims is to be accorded the broadest interpretation so as to encompass all modifications, equivalent structures, and functions.

This application claims priority from Japanese Patent Application No. 2011-227049 filed Oct. 14, 2011, which is hereby incorporated by reference herein in its entirety.

What is claimed is:

1. An information processing apparatus for selecting images used in an album indicating a group of a plurality of images, the information processing apparatus comprising:
a person setting unit configured to set a person appearing in an image included in the album;
an image evaluation unit configured to evaluate each group of images used for generating the album based on a position of the person set by the person setting unit in the image;
a count unit configured to count a number of times in which the person set by the person setting unit appears in a plurality of images; and
a selection unit configured to select images used in the album from the group of images based on evaluation made by the image evaluation unit and a count value obtained by the count unit.

2. The information processing apparatus according to claim 1, wherein the image evaluation unit evaluates each group of images based on a size of a face area of the person set by the person setting unit in the image.

3. The information processing apparatus according to claim 1, further comprising a priority setting unit configured to set a priority of the person set by the person setting unit, wherein the selection unit selects images used in the album to include more persons prioritized based on the priority.

4. The information processing apparatus according to claim 1, further comprising a classification unit configured to classify the group of images into groups based on shooting time or shooting location, wherein the selection unit selects at least one image belonging to each of the groups classified by the classification unit as images used in the album.

5. The information processing apparatus according to claim 1, wherein the selection unit selects images used in the album so that all persons set by the person setting unit appear at least a predetermined number of times.

6. The information processing apparatus according to claim 1, further comprising a cancel unit configured to cancel a selection of images by the selection unit based on the count value obtained by the count unit in images selected by the selection unit, wherein the cancel unit cancels the selection of images by the selection unit so that all persons set by the person setting unit appear at least a predetermined number of times in images used in the album after the cancel unit cancels the selection of images by the selection unit.

7. The information processing apparatus according to claim 6, wherein the cancel unit cancels the selection of images by the selection unit to decrease a difference in a number of appearances between the persons set by the person setting unit in images used in the album after the cancel unit cancels the selection of images by the selection unit.

8. The information processing apparatus according to claim 1, wherein the image is provided with a name of a person appearing therein and information about a position of the person in the image as meta data.

9. The information processing apparatus according to claim 1, wherein, if a first and a second person are set by the person setting unit and the selection unit selects a first image in which the first person appears but the second person does not appear, the selection unit selects a second image in which the second person appears and which is highest in evaluation made by the image evaluation unit.

10. An image selection method for selecting images used in an album indicating a group of a plurality of images, the image selection method comprising steps of:
- setting a person appearing in an image included in the album;
- evaluating each group of images used for generating the album based on a position of the person set by the person setting step in the image;
- counting a number of times in which the person set by the setting step appears in a plurality of images; and
- selecting images used in the album from the group of images based on evaluation made by the evaluating step and a count value obtained by the counting step,
- wherein the method is performed by using a computer or processor.

11. A non-transitory storage medium storing a program for causing a computer to execute the image selection method according to claim 10.

12. An album creation system for selecting images used in an album indicating a group of a plurality of images, the album creation system comprising:
- a person setting unit configured to set a person appearing in an image included in the album;
- an image evaluation unit configured to evaluate each group of images used for generating the album based on a position of the person set by the person setting unit in the image;
- a count unit configured to count a number of times in which the person set by the person setting unit appears in a plurality of images; and
- a selection unit configured to select images used in the album from the group of images based on evaluation made by the image evaluation unit and a count value obtained by the count unit.

* * * * *